(12) United States Patent
Zaitsu et al.

(10) Patent No.: US 6,683,797 B2
(45) Date of Patent: Jan. 27, 2004

(54) MULTI-STAGE DC—DC CONVERTER

(75) Inventors: Toshiyuki Zaitsu, Chuo-Ku (JP);
Masakazu Takagi, Chuo-Ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/349,422

(22) Filed: Jan. 22, 2003

(65) Prior Publication Data

US 2003/0137853 A1 Jul. 24, 2003

(30) Foreign Application Priority Data

Jan. 24, 2002 (JP) ........................................ 2002-015839

(51) Int. Cl.[7] ............................................... H02M 7/217
(52) U.S. Cl. ............................ 363/16; 363/21.1; 363/97
(58) Field of Search ................................ 363/16, 21.01, 363/21.1, 21.11, 55, 97, 131

(56) References Cited

U.S. PATENT DOCUMENTS

| 4,975,820 | A | * | 12/1990 | Szepesi ..................... 363/21.17 |
| 6,400,582 | B1 | * | 6/2002 | Hemena et al. ............ 363/21.04 |
| 6,442,052 | B1 | * | 8/2002 | Hemena et al. ................ 363/97 |
| 6,487,098 | B2 | * | 11/2002 | Malik et al. .................... 363/89 |

OTHER PUBLICATIONS

Abe, Seiya et al., "Dynamic Characteristics of 2–stage DC–DC Converter with Low Voltage and High Current", *Proceedings of the 2002 IEICE General Conference; The Institute of Electronics, Information and Communication Engineers*, Mar. 27, 2002, 7 pages.

Abe, Seiya et al., "Dynamic Characteristics of 2–stage DC–DC Converter with Low Voltage and High Current", *JIASC 2002, Proceedings of the 2002 Japan Industry Applications Society Conference*, 5 pages.

Alou, P. et al., "Buck + Half Bridge (d = 50%) Topology Applied to very Low Voltage Power Converters", *2001 IEEE* 7 pages.

* cited by examiner

*Primary Examiner*—Bao Q. Vu
(74) *Attorney, Agent, or Firm*—Seed IP Law Group PLLC

(57) ABSTRACT

A multi-stage DC—DC converter is provided that utilizes multiple loops in the control system to perform stable operation. The multi-stage DC—DC converter includes: a first DC—DC converter, a second DC—DC converter provided as a latter stage to said first DC—DC converter and a control circuit that controls the switching operation performed by said first DC—DC converter based on at least the output voltage of said first DC—DC converter and the output voltage of said second DC—DC converter. Since the control system is formed with an external loop for feedback of the output voltage of the second DC—DC converter and an internal loop for feedback of the output voltage of the first DC—DC converter, the resonance frequencies on the low-frequency side in the transfer function of the entire control system are shifted to higher frequencies than in the case where the control system consists of a single loop, even in cases where stabilization of the control system is difficult with single-loop output voltage feedback control. Accordingly, the frequency at which the phase crosses zero degrees is becomes higher, so the gain margin increases and the operation of the control system can be stabilized.

16 Claims, 20 Drawing Sheets

F I G. 1 1
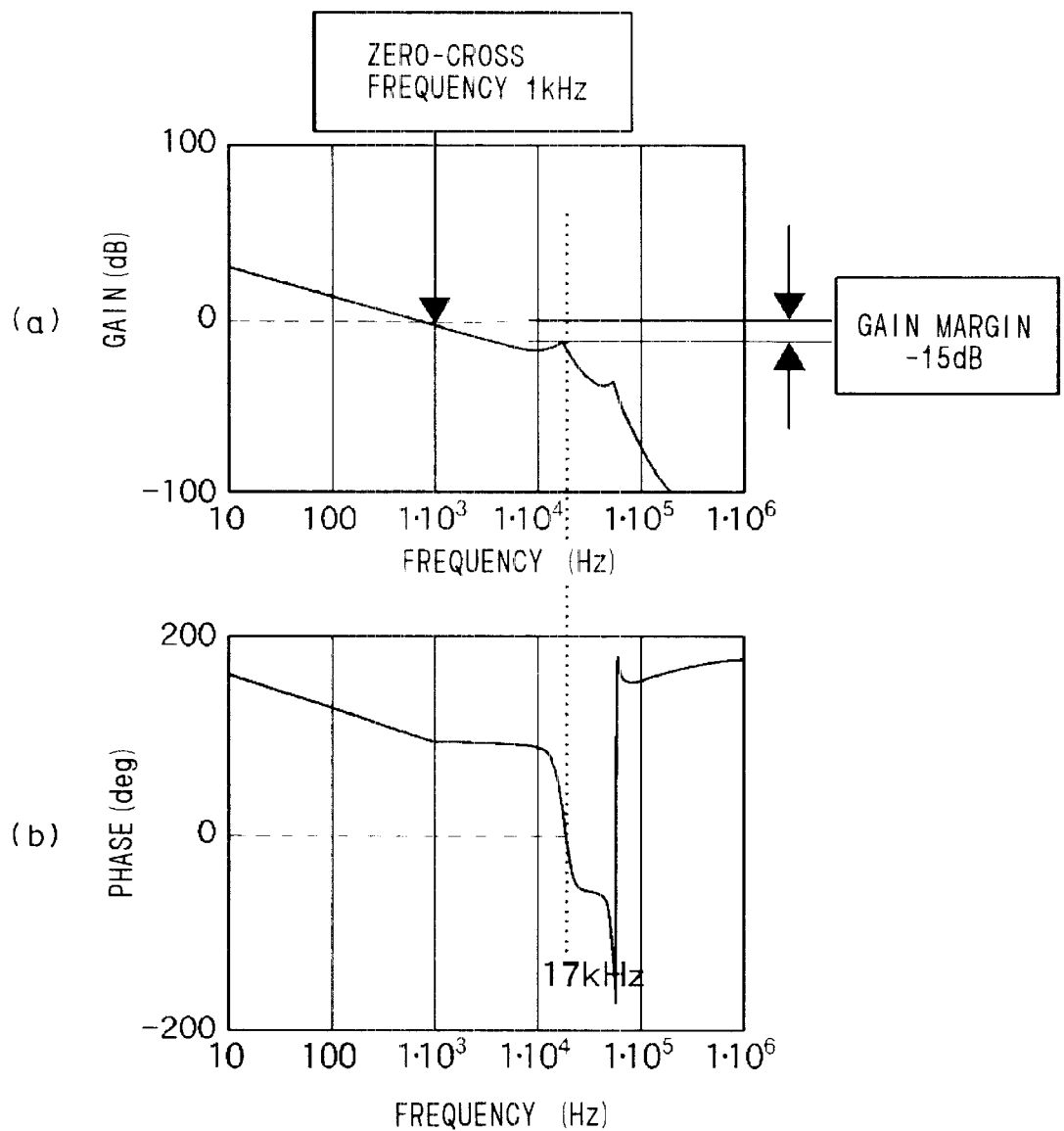

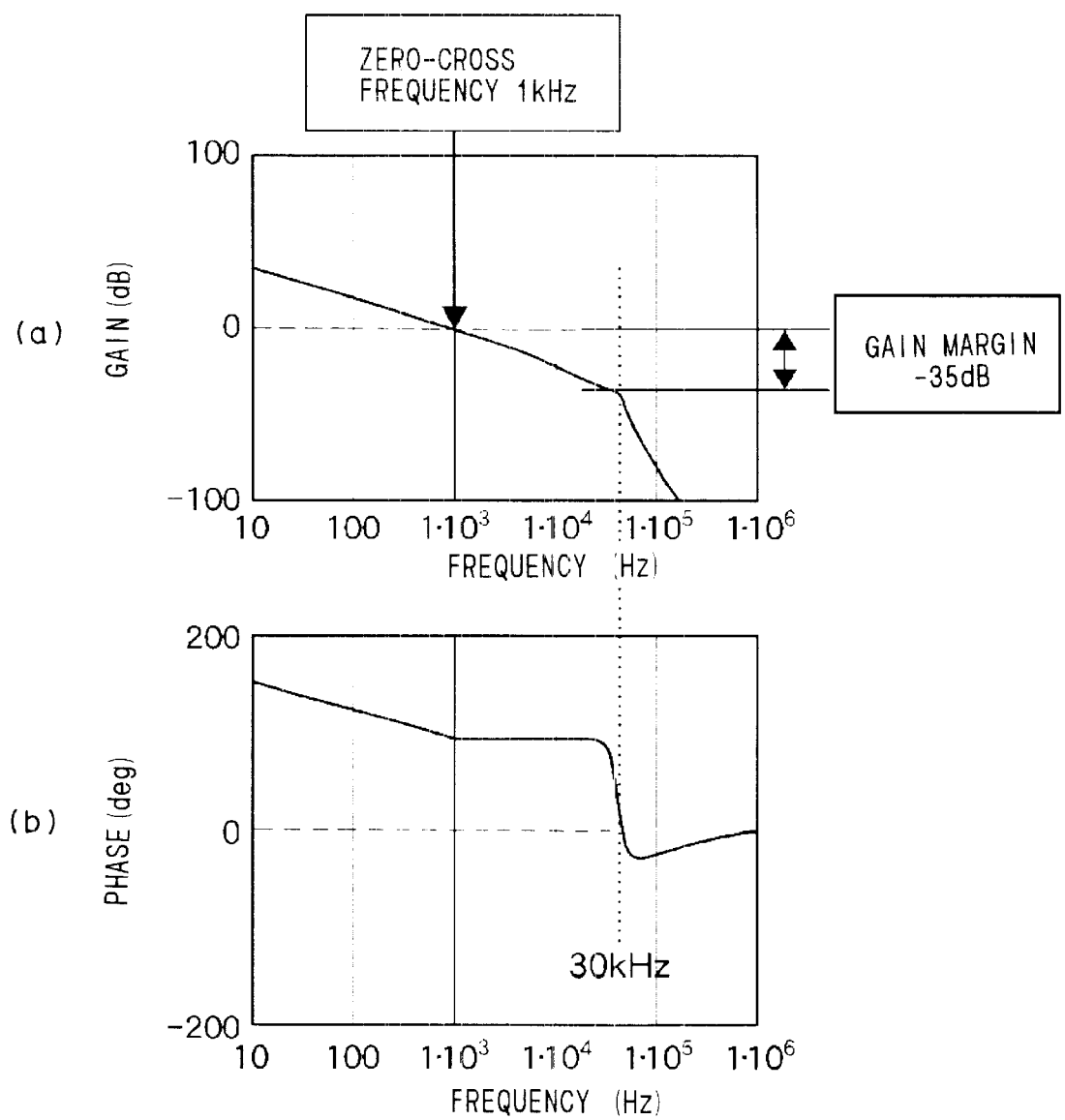
F I G. 1 4

FIG. 20
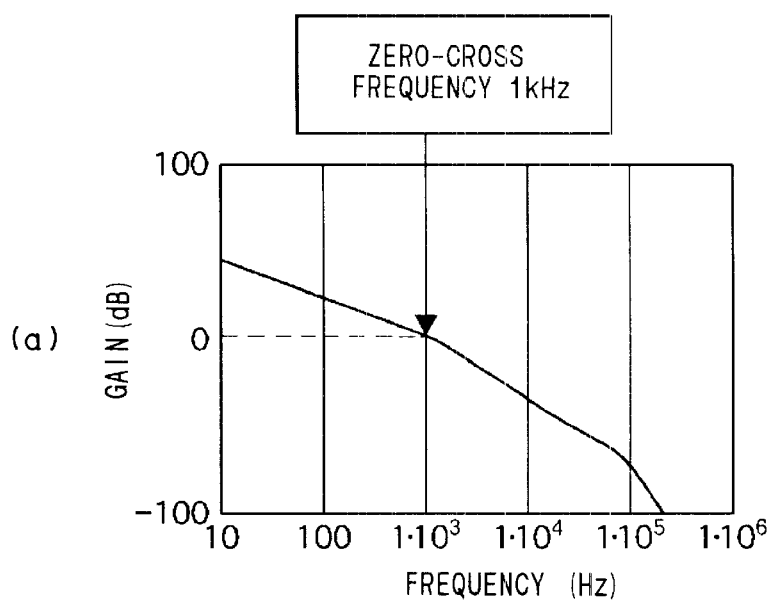
(a)
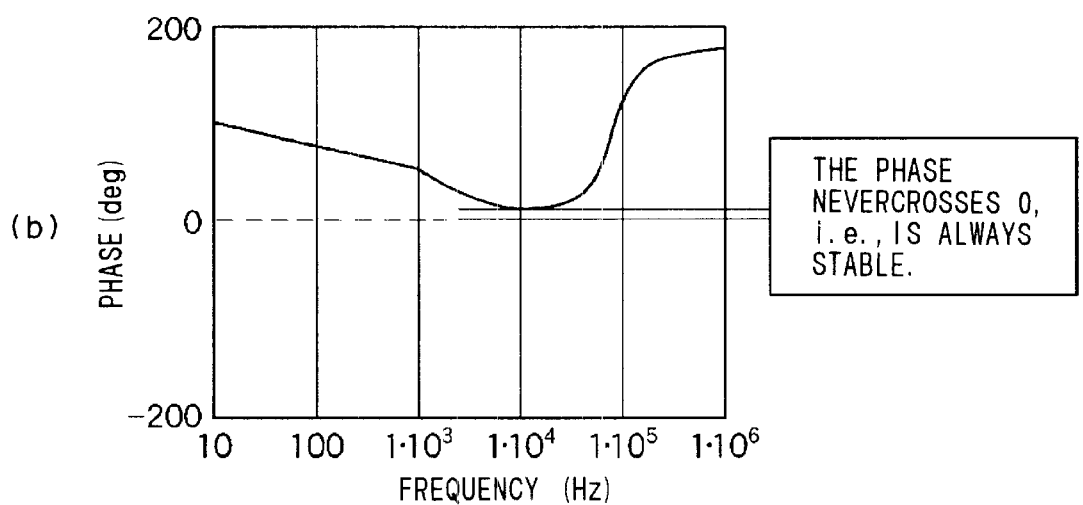
(b)

MULTI-STAGE DC—DC CONVERTER

BACKGROUND OF THE INVENTION

The present invention relates to a multi-stage DC—DC converter wherein a plurality of converters is connected in series, and particularly to a multi-stage DC—DC converter wherein control of the output voltage is performed by means of negative feedback of the output voltage.

DESCRIPTION OF THE PRIOR ART

In recent years, DC—DC converters used for communication have lower output voltages and higher currents and, accordingly, improving efficiency is even more important than previously. To this end, techniques of increasing efficiency by connecting two converters in series have attracted attention. Such DC—DC converters are called two-stage DC—DC converters.

Known methods of controlling two-stage DC—DC converters include a method of achieving stability of operation by optimizing the values of the inductors and capacitors within the converters and also the equivalent series resistance values of capacitors (see P. Alou et al.; "Buck+Half Bridge (d=50%) Topology Applied to Very Low Voltage Power Converters," IEEE Applied Power Electronics Conference (APEC) 2001).

In this method, specifically, the resonance frequencies of the inductors and capacitors of the first stage and second stage are separated from each other and the values of the equivalent series circuits are enlarged to achieve stable operation of the control system.

However, when a two-stage DC—DC converter is manufactured as an actual product, because of limitations with respect to the shape and mounting surface area, it is difficult to use inductors and capacitors that are optimal for control. In addition, because of standards for the output ripple voltage, it is difficult to increase the equivalent series resistance value of capacitors.

In addition, with a single-stage DC—DC converter, there are known methods of achieving stable operation of the control system using multiple loops, but with two-stage DC—DC converters, there are many unknown areas with respect to what kind of multiple-loop scheme can be used to achieve stability of operation of the control system. This point is the same for DC—DC converters wherein three or more converters are connected in series.

SUMMARY OF THE INVENTION

It is therefore an object of the present invention to provide a multi-stage DC—DC converter that uses multiple loops in the control system and that can achieve stable operation.

In addition, another object of the present invention is to provide a multi-stage DC—DC converter with a simple construction that achieves stability by means of a multiple-loop control system even in cases wherein stabilization of the control system is difficult with single-loop output voltage feedback control.

In order to solve the aforementioned problem, a multi-stage DC—DC converter was analyzed by means of state-space averaging, and state equations were derived so that stable control can be performed based on a multiple loops.

Specifically, a multi-stage DC—DC converter as one aspect of the present invention is a multi-stage DC—DC converter comprising: a non-isolated DC—DC converter that is able to adjust the intermediate voltage by PWM control as the first stage, an isolated DC—DC converter as the second stage and a PWM controller that controls the duty cycle of switching of the first stage by means of negative feedback of the output voltage of the second-stage converter, characterized in that the intermediate voltage of the first-stage converter is provided as negative feedback to the PWM controller.

Here, in a preferred embodiment of the present invention, the intermediate voltage is provided as negative feedback to the PWM controller via an operational amplifier.

With this configuration, the input voltage is converted to pulses by the switching of the PWM controller in the first-stage converter and also, the intermediate voltage is adjusted based on the duty cycle of switching, and moreover voltage conversion is performed at the transformer winding ratio in the second-stage converter, thus generating an averaged output voltage.

In this case, not only is the output voltage of the second-stage converter provided as negative feedback to the PWM controller via an external loop, but the intermediate voltage of the first-stage converter is also provided as negative feedback via an internal loop.

Thereby, compared with the case of an external loop alone, the resonance frequency on the low-frequency side in the transfer function of the entire control system is shifted to a higher frequency and accordingly, the frequency at which the phase crosses zero degrees also becomes higher. Accordingly, the gain margin is increased and the operation of the control system is stabilized.

In addition, a multi-stage DC—DC converter as another aspect of the present invention is a two-stage DC—DC converter comprising: a non-isolated DC—DC converter that is able to adjust the intermediate voltage by PWM control as the first stage, an isolated DC—DC converter as the second stage and a PWM controller that controls the duty cycle of switching of the first stage by means of negative feedback of the output voltage of the second-stage converter, characterized in that the intermediate voltage of the first-stage converter is provided as positive feedback to the PWM controller.

With this configuration, the input voltage is converted to pulses by the switching of the PWM controller in the first-stage converter and also, the intermediate voltage is adjusted based on the duty cycle of switching, and moreover voltage conversion is performed at the transformer winding ratio in the second-stage converter, thus generating an averaged output voltage.

In this case, not only is the output voltage of the second-stage converter provided as negative feedback to the PWM controller via an external loop, but the intermediate voltage of the first-stage converter is also provided as positive feedback via an internal loop.

Thereby, compared with the case of an external loop alone, the resonance peak on the low-frequency side in the transfer function of the entire control system vanishes and accordingly, the frequency at which the phase crosses zero degrees also becomes much higher. Accordingly, the gain margin is increased considerably and the operation of the control system is even more stabilized.

In addition, a multi-stage DC—DC converter as still another aspect of the present invention is a two-stage DC—DC converter comprising: a non-isolated DC—DC converter that is able to adjust the intermediate voltage by PWM control as the first stage, an isolated DC—DC converter as the second stage and a PWM controller that controls the duty cycle of switching of the first stage by means of negative feedback of the output voltage of the second-stage converter, characterized in that the switching current of the first-stage converter is provided as feedback to the PWM controller.

With this configuration, the input voltage is converted to pulses by the switching of the PWM controller in the first-stage converter and also, the intermediate voltage is adjusted based on the duty cycle of switching, and moreover voltage conversion is performed at the transformer winding ratio in the second-stage converter, thus generating an averaged output voltage.

In this case, not only is the output voltage of the second-stage converter provided as negative feedback to the PVVM controller via an external loop, but the switching current of the first-stage converter is also provided instead of a reference signal via an internal loop.

Thereby, compared with the case of an external loop alone, the resonance frequency on the low-frequency side in the transfer function of the entire control system vanishes and becomes an inflection point and accordingly, fourth order delay becomes third order delay. Accordingly, the gain margin is further increased and the operation of the control system is even more stabilized.

In addition, a multi-stage DC—DC converter as still another aspect of the present invention is a two-stage DC—DC converter comprising: a non-isolated DC—DC converter that is able to adjust the intermediate voltage by PWM control as the first stage, an isolated DC—DC converter as the second stage and a PWM controller that controls the duty cycle of switching of the first stage by means of negative feedback of the output voltage of the second-stage converter, characterized in that the current flowing through the second-stage converter is provided as feedback to the PWM controller.

With this configuration, the input voltage is converted to pulses by the switching of the PWM controller in the first-stage converter and also, the intermediate voltage is adjusted based on the duty cycle of switching, and moreover voltage conversion is performed at the transformer winding ratio in the second-stage converter, thus generating an averaged output voltage.

In this case, not only is the output voltage of the second-stage converter provided as negative feedback to the PWM controller via an external loop, but the current flowing through the second-stage converter, e.g. the output inductor current, is also provided instead of a reference signal via an internal loop.

Thereby, compared with the case of an external loop alone, the phase in the transfer function of the entire control system no longer crosses zero degrees. Accordingly, the operation of the control system is constantly stabilized.

Note that in the present invention, "multi-stage" refers to where two or more converters are connected in series.

BRIEF DESCRIPTION OF THE DRAWINGS

FIG. 11 presents Bode plots showing the frequency response of the two-stage DC—DC converter 10 shown in FIG. 8, where (a) is a Bode plot showing the gain as a function of frequency, while (b) is a Bode plot showing the phase as a function of frequency.

FIG. 14 presents Bode plots showing the frequency response of the two-stage DC—DC converter 20 shown in FIG. 12, where (a) is a Bode plot showing the gain as a function of frequency, while (b) is a Bode plot showing the phase as a function of frequency.

FIG. 20 presents Bode plots showing the frequency response of the two-stage DC—DC converter 40 shown in FIG. 18, where (a) is a Bode plot showing the gain as a function of frequency, while (b) is a Bode plot showing the phase as a function of frequency.

DESCRIPTION OF THE PREFERRED EMBODIMENTS

First, in order to demonstrate the advantage of the present invention, before describing the multi-stage DC—DC converters according to preferred embodiments of the invention in detail, we shall describe the basic circuit structure of the multi-stage DC—DC converter and the problems that occur when output voltage feedback control is performed with a single loop.

Figure 1:
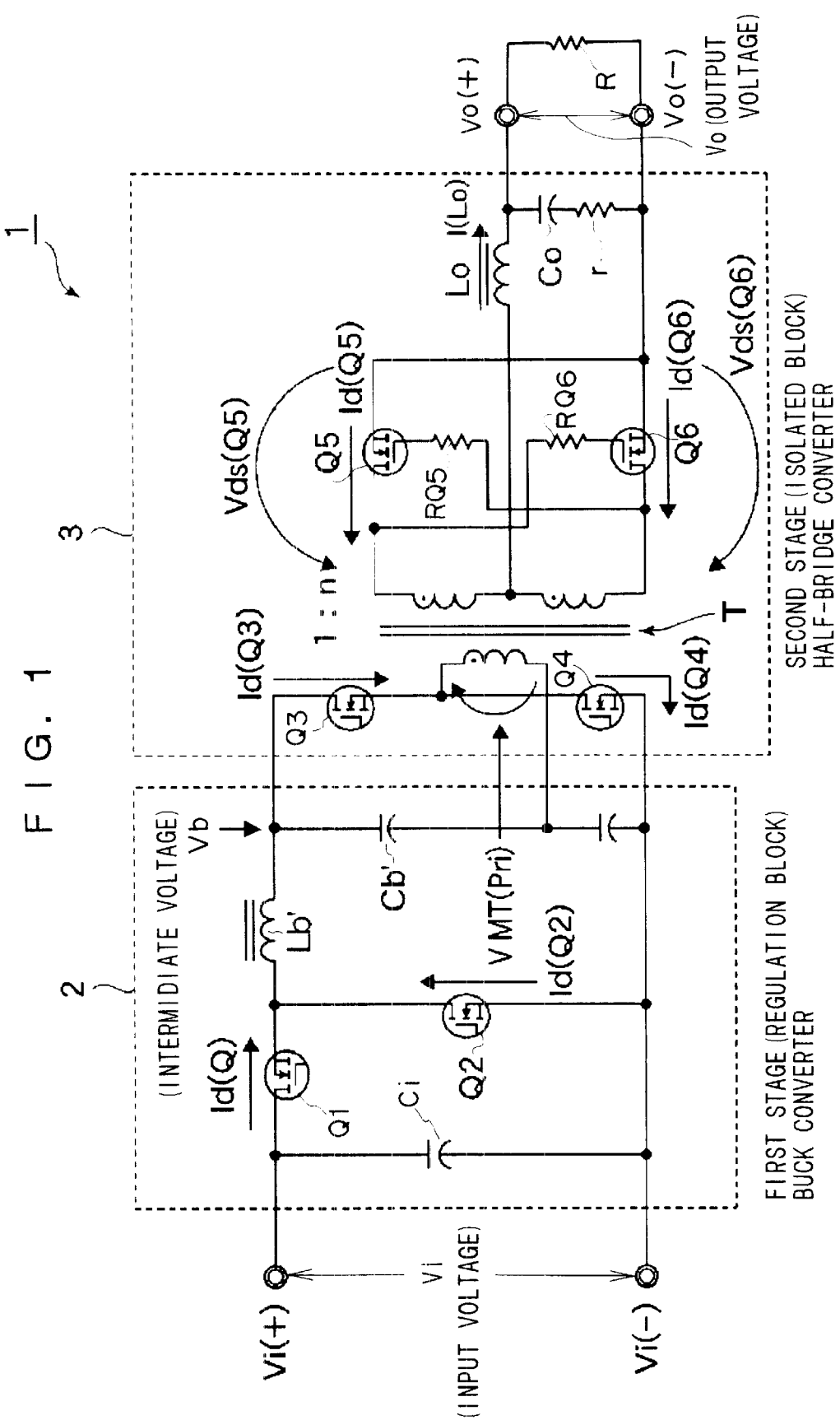
FIG. 1 is a circuit diagram showing the main circuit of a two-stage DC—DC converter.

FIG. 1 is a circuit diagram showing the main circuit of a two-stage DC—DC converter which is one type of multi-stage DC—DC converter.

As shown in FIG. 1, the main circuit 1 of the two-stage DC—DC converter consists of a non-isolated converter 2 as the first stage and an isolated converter 3 as the second stage.

The aforementioned first-stage converter 2 is constructed as a so-called "buck" PWM regulation block, consisting of two switching transistors (FETs) Q1 and Q2 that perform pulse width control by switching based on the PWM controller (not shown) and an inductor Lb' and capacitor Cb' that perform pulse averaging.

Moreover, by means of the switching of the aforementioned PWM controller, the intermediate voltage $V_b$ is kept constant despite fluctuations in the input voltage $V_i$ and load R. Note that the input capacitor $C_i$ contained in the first-stage converter 2 is a capacitor for stabilizing the input voltage $V_i$.

In addition, the second-stage converter 3 is constructed as a so-called "half bridge" type, consisting of two switching transistors Q3 and Q4 that take the intermediate voltage $V_b$ from the first-stage converter 2 and convert it to pulses, a transformer T that transforms the voltage based on the number of turns n, rectifying transistors Q5 and Q6 and resistors $R_{Q5}$ and $R_{Q6}$ that rectify the secondary-side voltage of the transformer T and inductor Lo and capacitor Co which perform pulse averaging. The rectifying transistors Q5 and Q6 and resistors $R_{Q5}$ and $R_{Q6}$ constitute a self-driven type rectifying circuit. In addition, the resistance r connected in series with the capacitor Co is the equivalent series resistance (ESR) of the capacitor Co.

With the main circuit 1 having such a construction, in the first-stage converter 2, the input voltage $V_i$ is pulsed and the pulse width is controlled to the duty ratio D by the switching transistors Q1 and Q2 which are switched by the PWM controller and then averaging is performed by the filter consisting of the inductor Lb' and capacitor Cb' and thus the intermediate voltage $V_b$ is generated.

Moreover, in the second-stage converter 3, this intermediate voltage $V_b$ is pulsed by the switching transistors Q3 and Q4, the voltage is transformed based on the number of turns n of the transformer T, it is again averaged by a filter consisting of the inductor Lo and capacitor Co, and thus the output voltage $V_o$ is generated. This output voltage $V_o$ is supplied to the load R.

Here, the output voltage $V_o$ can be adjusted by changing the duty ratio D under PWM control and thus varying the ON time of the switching transistor Q1. Note that the switching transistors Q3 and Q4 contained within the second-stage converter 3 are controlled such that the duty cycle of ON/OFF switching is constant.

Figure 2:
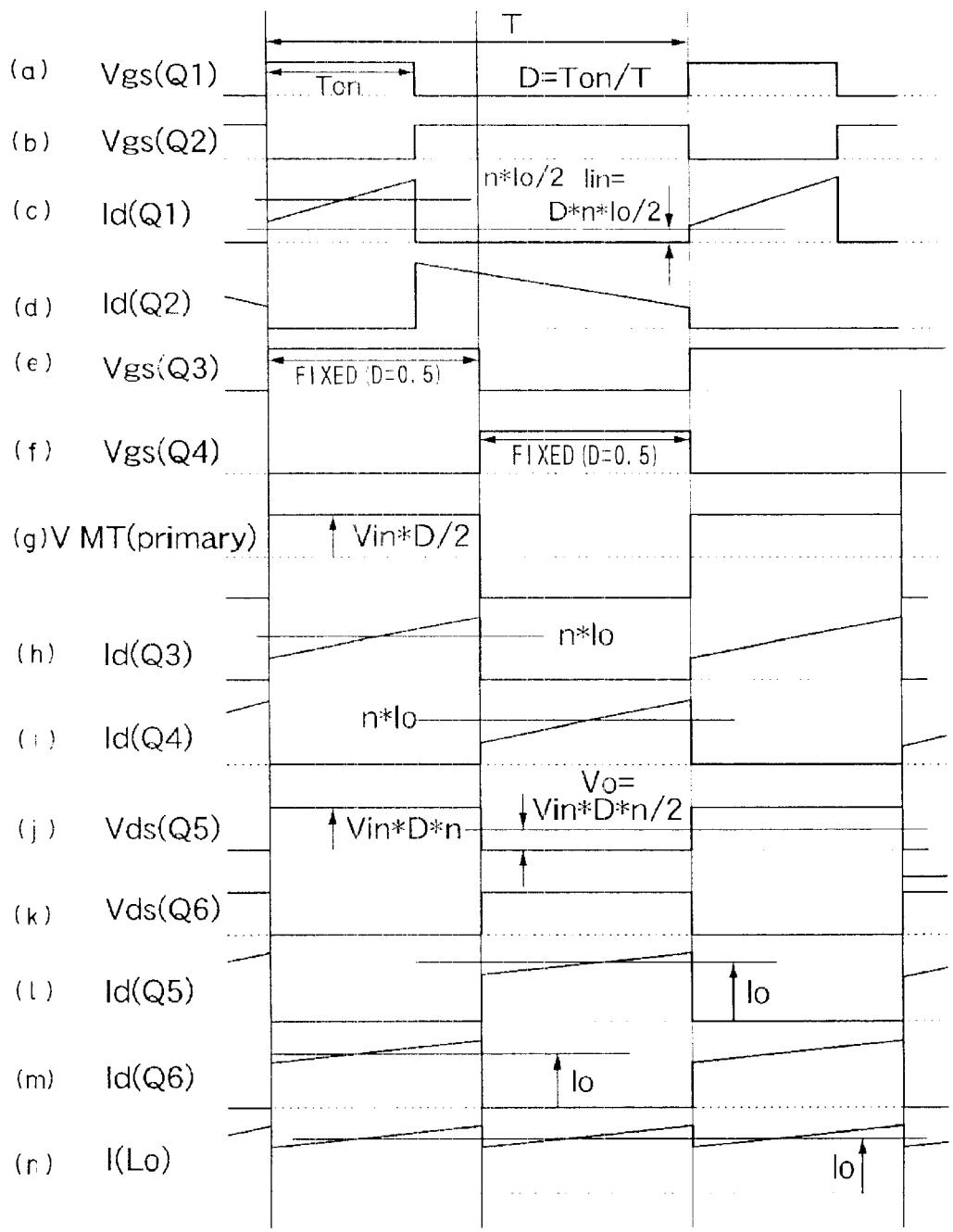
FIG. 2 is a waveform chart showing the operation of the main circuit 1 of the two-stage DC—DC converter shown in FIG. 1.

FIG. 2 is a waveform chart showing the operation of the main circuit 1 of the two-stage DC—DC converter shown in FIG. 1, where (a) shows the gate-source voltage $V_{gs}$ of switching transistor Q1, (b) shows the gate-source voltage $V_{gs}$ of switching transistor Q2, (c) shows the current $I_{d(Q1)}$ flowing through switching transistor Q1, (d) shows the current $I_{d(Q2)}$ flowing through switching transistor Q2, (e) shows the gate-source voltage $V_{gs(Q3)}$ of switching transistor Q3, (f) shows the gate-source voltage $V_{gs(Q4)}$ of switching transistor Q4, (g) shows the voltage $V_{MT(primary)}$ of the primary-side coil of transformer T, (h) shows the current $I_{d(Q3)}$ flowing through switching transistor Q3, (i) shows the current $I_{d(Q4)}$ flowing through switching transistor Q4, (j) shows the gate-source voltage $V_{gs(Q5)}$ of rectifying transistor Q5, (k) shows the gate-source voltage $V_{gs(Q6)}$ of rectifying transistor Q6, (l) shows the current $I_{d(Q5)}$ flowing through switching transistor Q5, (m) shows the current $I_{d(Q6)}$ flowing through switching transistor Q6 and (n) shows the output inductor current $I_{(Lo)}$ of the inductor Lo.

Here, in the main circuit 1 of a two-stage DC—DC converter, second order delay is typically generated in each of the first-stage converter 2 and second-stage converter 3, so fourth order delay is generated overall.

We will now validate this fourth order delay by using the state-space averaging method to find the transfer function of the main circuit 1.

Figure 3:
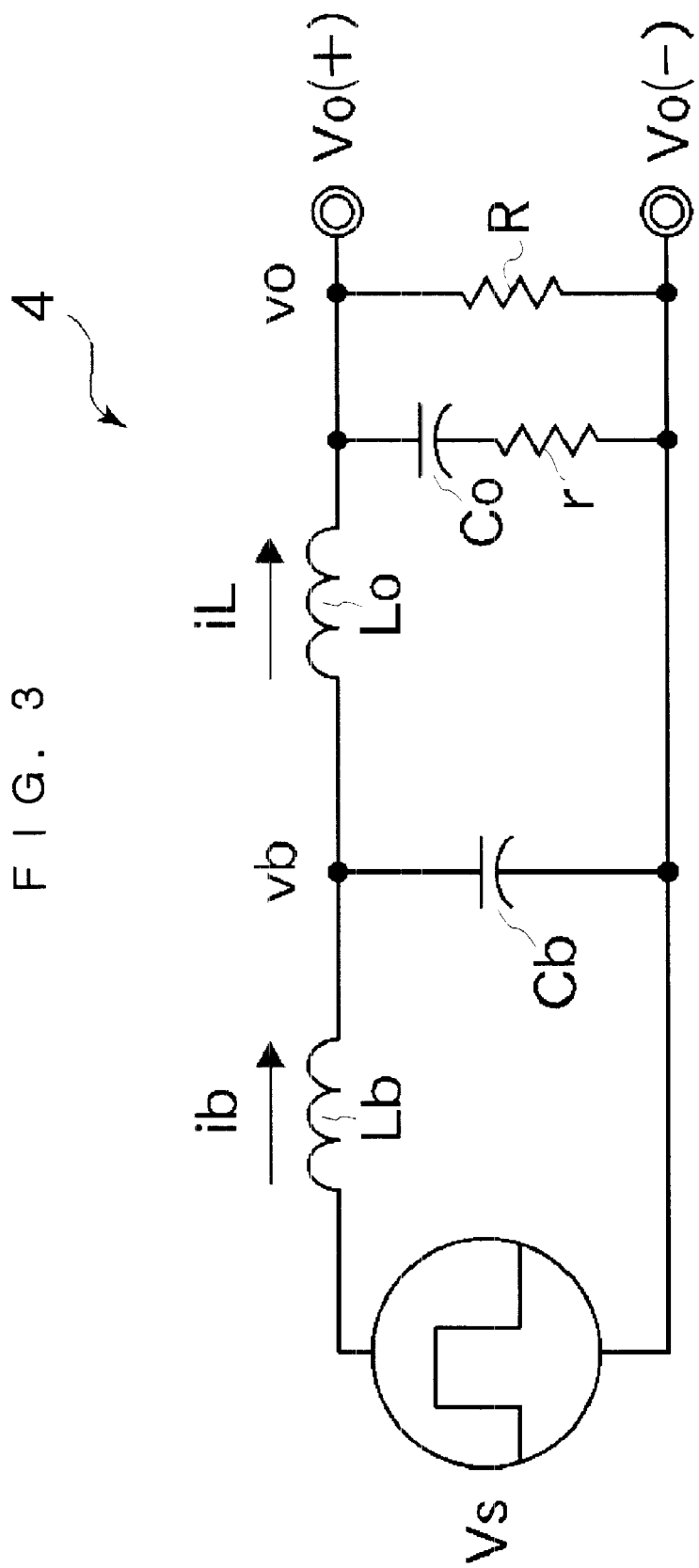
FIG. 3 is an equivalent circuit model of the main circuit 1 of the two-stage DC—DC converter shown in FIG. 1.

In order to simplify, if the second-stage converter 3 operates with a constant duty ratio D (e.g., D=0.5), then the main circuit 1 can be represented by the two-stage filter equivalent circuit 4 shown in FIG. 3.

Here, the inductors Lb, Cb and Vs shown in FIG. 3 can be calculated by the formula $$Cb = \frac{Cb'}{n^2}, \quad Lb = \frac{n^2 \cdot Lb'}{2^2}, \quad Vs = \frac{Vin}{2} \cdot n \qquad (1)$$

respectively and converted as secondary-side components.

In the equivalent circuit 4 shown in FIG. 3, the state variable X is represented by:

$$X = [vo, iL, vb, ib]. \qquad (2)$$

Here, vo, iL, vb and ib are the output voltage and output inductor current of the second-stage converter 3 and the output voltage (intermediate voltage) and switching current of the first-stage converter 2, respectively.

Thereby, the equation of state of the main circuit 1 of the two-stage DC—DC converter is represented by:

$$\frac{d}{dt}X = A \cdot X + B \cdot Vs. \qquad (3)$$

Here, the matrices A and B in equation (3) above are represented respectively by:

$$A(R) = \begin{bmatrix} \frac{-1}{Co(R+r)} & \frac{R}{Co(R+r)} & 0 & 0 \\ \frac{-R}{Lo(R+r)} & \frac{-R \cdot r}{Lo(R+r)} & \frac{1}{Lo} & 0 \\ 0 & \frac{-1}{Cb} & 0 & \frac{1}{Cb} \\ 0 & 0 & \frac{-1}{Lb} & 0 \end{bmatrix}, \quad B(d) = \begin{bmatrix} 0 \\ 0 \\ 0 \\ \frac{D}{Lb} \end{bmatrix}. \qquad (4)$$

Based on these state equations (3) and (4), small-signal analysis (dynamic characteristics) is performed.

Regarding the above equations of state, solving the equation of state for infinitesimal changes in the time domain of the state variable X with respect to the duty ratio D and calculating by means of a Laplace transform gives the following:

$$\frac{\Delta X}{\Delta D} = (sI - A)^{-1} \cdot \frac{\partial B}{\partial D} \cdot Vs \quad (5)$$

$$= \frac{Vs}{Gch(s)} \cdot \begin{bmatrix} 1 \\ \{sCo(R+r)+1\}/R \\ \{s^2CoLo(R+r)+s(rCoR+Lo)+R\}/R \\ \{s^3CoCbLo(R+r)+s^2Cb(rCoR+Lo)+s(Cor+CbR+CoR)+1\}/R \end{bmatrix} \begin{matrix} \leftarrow vo \\ \leftarrow iL \\ \leftarrow vb \\ \leftarrow ib \end{matrix}$$

In this equation (5), Gch(s) is represented by:

$$Gch(s) = \{s^4 \cdot CoLoCbLb(R+r) + s^3 \cdot (rCoR+Lo)CbLb + \quad (6)$$
$$s^2 \cdot [CoLo(R+r) + CoLb(R+r) + CbLbR] +$$
$$s \cdot (rCoR + Lo + Lb) + R\}/R.$$

Here, the matrix elements on the right-hand side of equation (6) above correspond to, in order from top to bottom, vo, iL, vb and ib.

Accordingly, the transfer function Po(s) of the duty ratio D and output voltage vo(s), transfer function of the duty ratio D and the output inductor current iL(s) of the second-stage converter 3, transfer function of the duty ratio D and output voltage vb(s) and transfer function of the duty ratio D and the switching current ib(s) of the first-stage converter 2, are respectively represented by:

$$Po(s) = \frac{\Delta vo(s)}{\Delta D} = \frac{Vs}{Gch(s)} \cdot 1 \quad (7)$$

$$\frac{\Delta iL(s)}{\Delta D} = \frac{Vs}{Gch(s)} \cdot PiL(s) \quad (8)$$

$$\frac{\Delta vb(s)}{\Delta D} = \frac{Vs}{Gch(s)} \cdot Pb(s) \quad (9)$$

$$\frac{\Delta ib(s)}{\Delta D} = \frac{Vs}{Gch(s)} \cdot Pib(s) \quad (10)$$

Note that here, PiL(s), Pb(s) and Pib(s) are as follows:

$$PiL(s) = \{sCo(R+r)+1\}/R \quad (11)$$

$$Pb(s) = \{s^2CoLo(R+r)+s(CoR+Lo)+R\}/R \quad (12)$$

$$Pib(s) = \{s^3CoCbLo(R+r)+s^2Cb(rCoR+Lo)+s(Cor+CbR+CoR)+1\}/R \quad (13)$$

Accordingly, Gch(s) is a fourth order function of s in equation (6) above, so from equation (7), the transfer function Po(s) of the duty ratio D and output voltage vo(s) becomes a fourth order function, and one can see that fourth order delay occurs in the main circuit 1 of a two-stage DC—DC converter.

We shall now study the case of using single-loop output voltage feedback control in order to control the output voltage $V_o$ of the main circuit of such a two-stage DC—DC converter to the desired voltage value.

Figure 4:
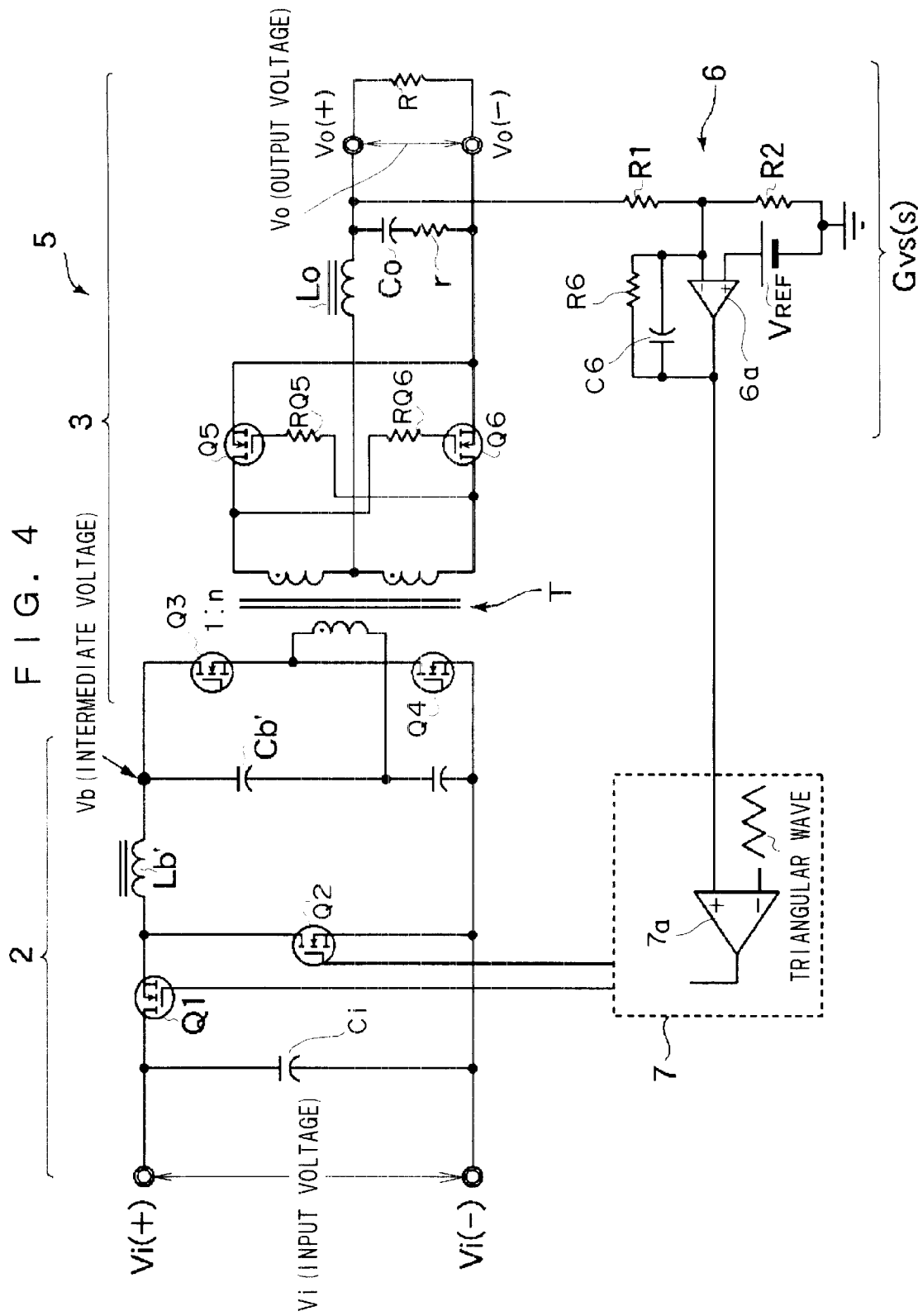
FIG. 4 is a circuit diagram showing a two-stage DC—DC converter that uses single-loop output voltage feedback control.

FIG. 4 is a circuit diagram showing a two-stage DC—DC converter that uses single-loop output voltage feedback control.

In FIG. 4, the two-stage DC—DC converter 5 has a structure consisting of the main circuit 1 of the two-stage DC—DC converter shown in FIG. 1 to which is added an error amplifier 6 and PWM controller 7. Here, the error amplifier 6 and PWM controller 7 constitute an output voltage feedback-type control circuit for the main circuit 1.

The aforementioned error amplifier 6 is provided with an error amp 6a, and the output voltage $V_o$ of the second-stage converter 3 is voltage-divided among resistors R1 and R2 and provided as input to the inverted input of the error amp 6a, while the reference voltage $V_{REF}$ is provided as input to the non-inverted input of the error amp 6a. In addition, a resistor R6 and capacitor C6 are connected in parallel between the non-inverted input and output of error amp 6a, and thus the response of the error amp 6a is limited so that the output voltage $V_o$ does not undergo abnormal oscillation.

The aforementioned PWM controller 7 is provided with a differential amp 7a, and a triangular wave is input to its inverted input as a reference signal, while the output signal from the aforementioned error amplifier 6 is input to its non-inverted input.

Figure 5:
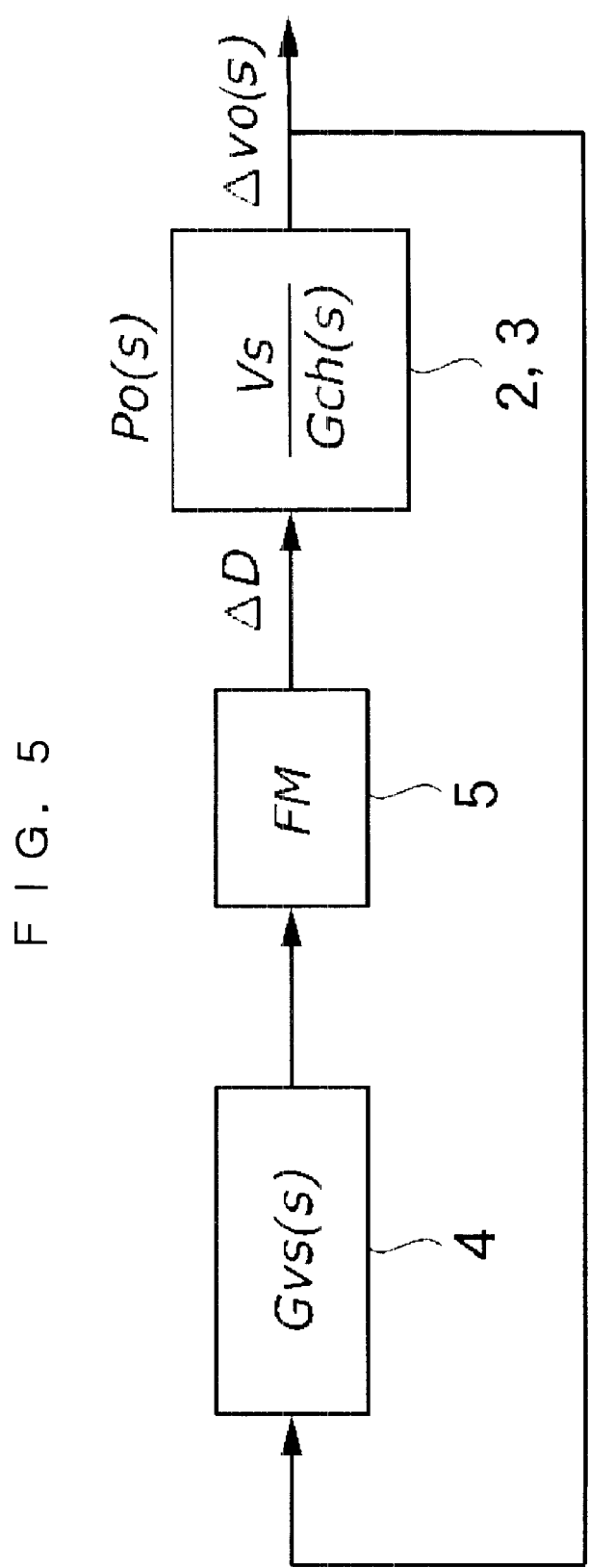
FIG. 5 is a block diagram showing the control system for the two-stage DC—DC converter 5 shown in FIG. 4.

With a two-stage DC—DC converter 5 having such a structure, the output voltage feedback control system based on the aforementioned error amplifier 6 and PWM controller 7 constitutes a single loop as shown in FIG. 5, and the transfer function PPo(s) of the overall open loop becomes $$PPo(s) = \frac{Vs}{Gch(s)} \cdot FM \cdot Gvs(s). \quad (14)$$

Here, FM is the conversion ratio of the duty ratio D with respect to the input voltage $V_i$ of the PWM controller 7 and Gvs(s) is the transfer function of the error amplifier 6.

Here follows a study of the first term Vs/Gch(s) on the right-hand side of equation (14) above. Assuming that the denominator Gch(s) is divisible by $\omega_\alpha$ and $\omega_\beta$, this becomes $$\frac{1}{Gch(s)} = \frac{1}{(s^2 + \omega_\alpha^2)(s^2 + \omega_\beta^2)}. \quad (15)$$

Here, $\omega_\alpha$ and $\omega_\beta$ respectively become:

$$\omega_\alpha = \sqrt{\frac{b + \sqrt{b^2 - 4a}}{2a}}, \omega_\beta = \sqrt{\frac{b - \sqrt{b^2 - 4a}}{2a}}. \quad (16)$$

As is evident from equation (16), taking the resonance point fb of the second-stage converter 3, output filter resonance point fo of the second-stage converter 3, and resonance points fbo and fob found by combining the respective inductors and capacitors to be:

$$fb = \frac{1}{2\pi\sqrt{LbCb}}, fo = \frac{1}{2\pi\sqrt{LoCo}}, \quad (17)$$

$$fbo = \frac{1}{2\pi\sqrt{LbCo}}, fob = \frac{1}{2\pi\sqrt{LoCb}}$$

the resonance points of 1/Gch(s) become values different from these reference points fb, fo, fbo and fob.

Figure 6:
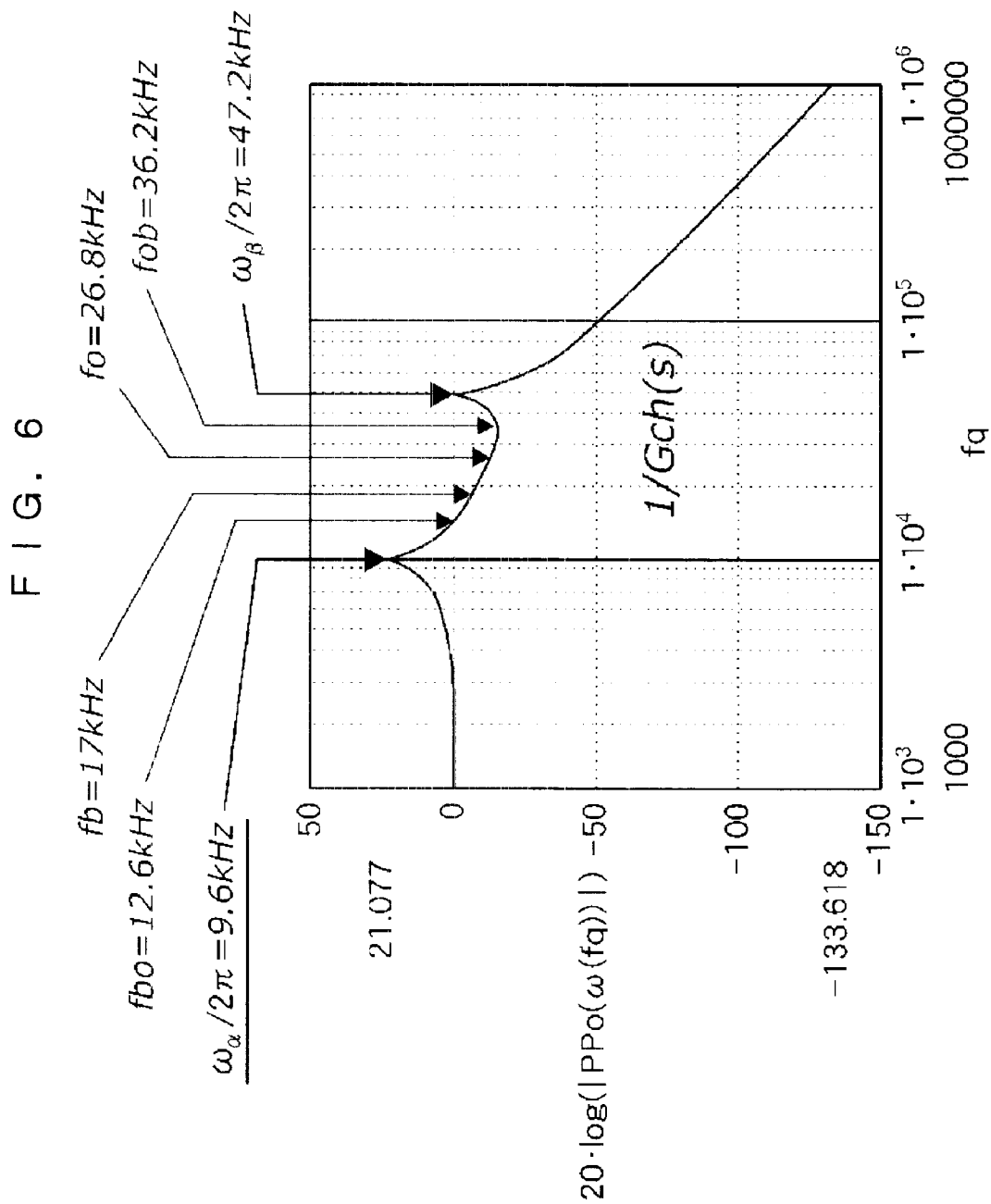
FIG. 6 is a graph showing the resonance frequency of the two-stage DC—DC converter 5 shown in FIG. 4.

As an example, taking:

Lb=0.68 µH,

Cb=128 µF (secondary-side converted value),

Lo=0.15 µH,

Co=235 µF, then fb=17 kHz, fo=26.8 kHz, fbo=12.6 kHz, fob=36.2 kHz, and also $\omega_\alpha/2\pi$=9.6 kHz and $\omega_\beta/2\pi$=47.2 kHz. When these resonance points are graphed as shown in FIG. 6, one can see that the new resonance points $\omega_\alpha$ and $\omega_\beta$ occur on the outside, namely the low-frequency and high-frequency sides, of the reference points fb, fo, fbo and fob. In this manner, in a two-stage DC—DC converter, the resonance points only become evident with analysis.

Figure 7:
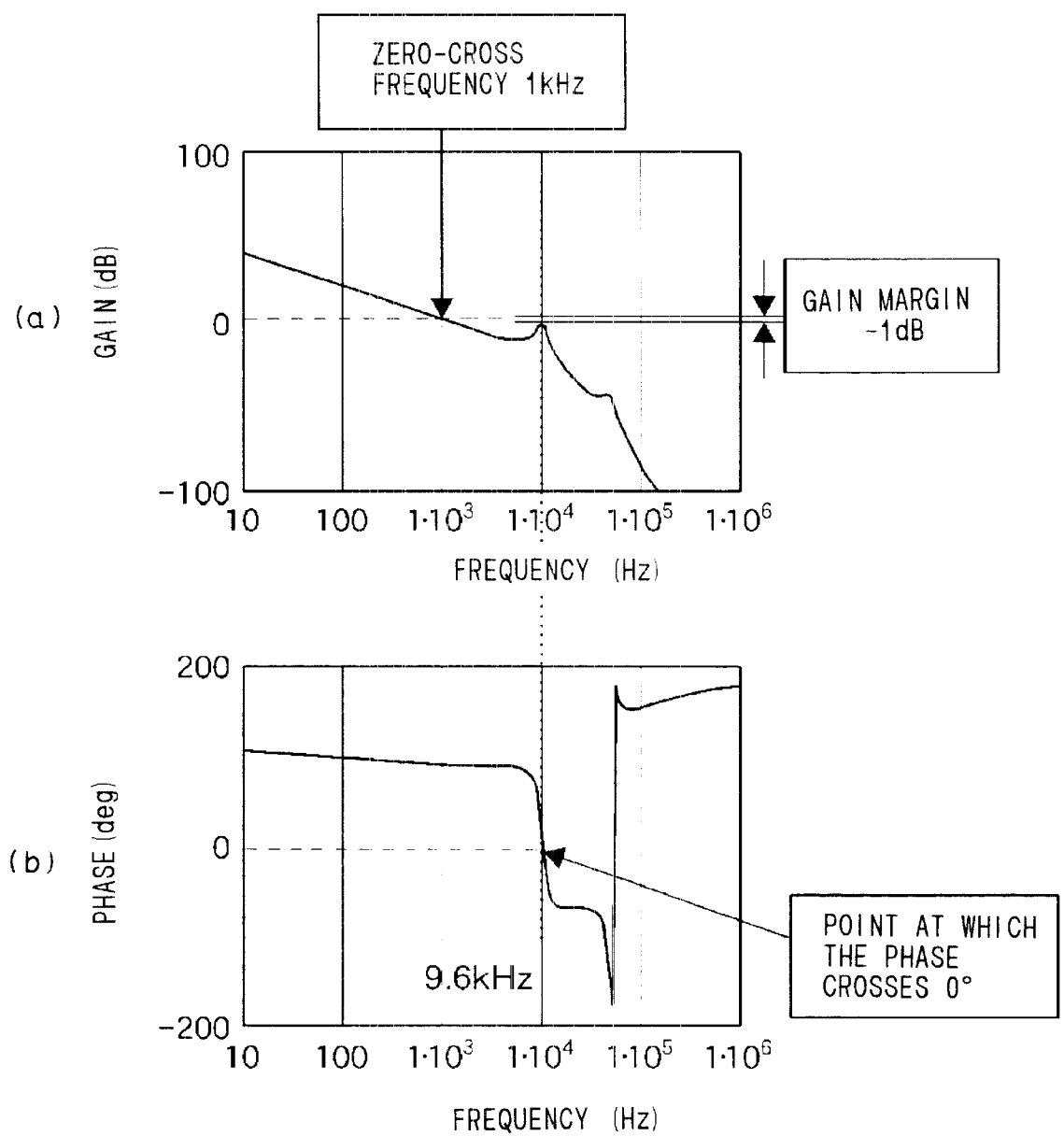
FIG. 7 presents Bode plots showing the frequency response of the two-stage DC—DC converter 5 shown in FIG. 4, where (a) is a Bode plot showing the gain as a function of frequency, while (b) is a Bode plot showing the phase as a function of frequency.

Moreover, if the equivalent series resistance (ESR) of the output capacitor is set to r=10 mΩ, then upon finding Bode plots of the gain and phase as a function of frequency in the transfer function PPo(s) of the single-loop output voltage feedback control, the Bode plots are as shown in FIG. 7. In FIG. 7, (a) is a Bode plot showing the gain as a function of frequency, while (b) is a Bode plot showing the phase as a function of frequency.

Here, when the frequency response of the error amplifier 6 is adjusted so that the zero-cross frequency for gain becomes 1 kHz, then the gain margin at the frequency at which the phase crosses zero degrees is as follows.

In this case, the phase rotates rapidly at the first resonance point ($\omega_\alpha/2\pi$) and crosses zero degrees at approximately 9.6 kHz, so the gain margin becomes approximately −1 dB. Considering that the gain margin on the Bode plot is typically set to roughly −20 dB when designing the power supply control system, one can see that there is nearly no margin at all. From the above, one can see that the operation of the control system is unstable in the two-stage DC—DC converter 5 shown in FIG. 4.

In this manner, one can see that stabilization of the control system in a two-stage DC—DC converter is difficult when single-loop output voltage feedback control is used.

Here follows a detailed description of a multi-stage DC—DC converter according to a preferred embodiment of the present invention.

Note that the embodiment presented below is a preferred specific example of the present invention to which are applied various technically preferable limitations, but the scope of the present invention is in no way limited to these modes unless the following explanation explicitly limits the present invention.

Figure 8:
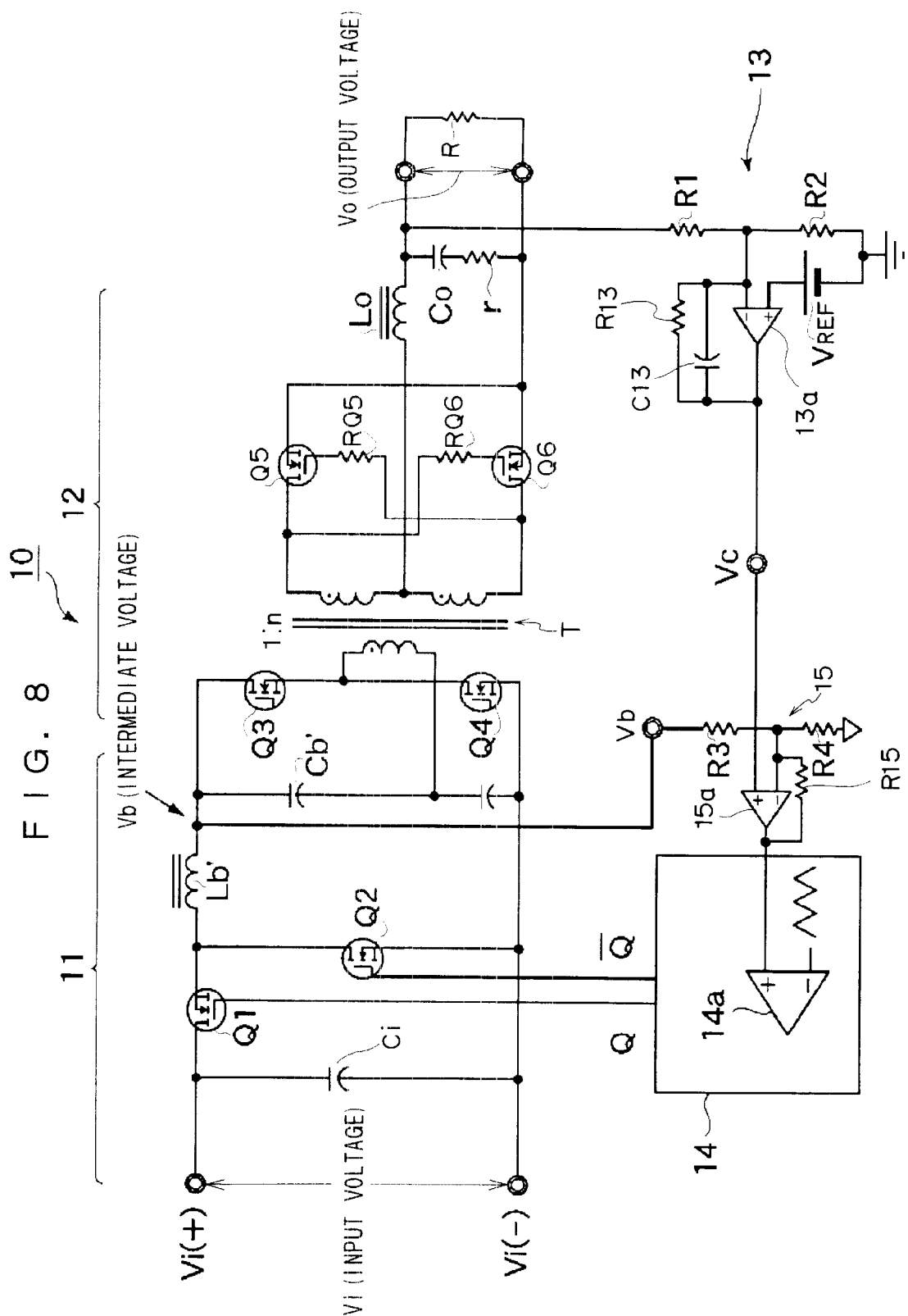
FIG. 8 is a circuit diagram showing the two-stage DC—DC converter according to Preferred Embodiment 1 of the present invention.

FIG. 8 is a circuit diagram showing the two-stage DC—DC converter according to Preferred Embodiment 1 of the present invention. In FIG. 8, a two-stage DC—DC converter 10 comprises: a first-stage non-isolated converter 11, a second-stage isolated converter 12, an error amplifier 13 and a PWM controller 14.

The aforementioned first-stage converter 11 is constructed as a so-called "buck" PWM regulation block, consisting of two switching transistors (FET) Q1 and Q2 that perform pulse width control by switching based on the PWM controller 14, an inductor Lb' and capacitor Cb' that perform pulse averaging and an input capacitor Ci used to stabilize the input voltage $V_i$. Namely, the first-stage converter 11 has a structure similar to that of the first-stage converter 2 of the two-stage DC—DC converter 5 shown in FIG. 4.

Moreover, by means of the switching of the aforementioned PWM controller 14, the intermediate voltage $V_b$ is kept constant despite fluctuations in the input voltage $V_i$ and load.

In addition, the second-stage converter 12 is constructed as a so-called "half bridge" type, consisting of two switching transistors Q3 and Q4 that take the intermediate voltage $V_b$ from the first-stage converter 11 and convert it to pulses, a transformer T that transforms the voltage based on the number of turns n, rectifying transistors Q5 and Q6 and resistors $R_{12a}$ and $R_{12b}$ that rectify the secondary-side voltage of the transformer T and inductor Lo and capacitor Co which perform pulse averaging. The rectifying transistors Q5 and Q6 and resistors $R_{12a}$ and $R_{12b}$ constitute a self-driven type rectifying circuit. In this manner, the second-stage converter 12 has a structure similar to that of the second-stage converter 3 of the DC—DC converter 5 shown in FIG. 4.

The aforementioned error amplifier 13 is provided with an error amp 13a, and the output voltage $V_0$ of the second-stage converter 12 is voltage-divided among resistors R1 and R2 and provided as input to the inverted input of the error amp 13a, while the reference voltage $V_{REF}$ is provided as input to the non-inverted input of the error amp 13a. In addition, a resistor R13 and capacitor C13 are connected in parallel between the non-inverted input and output of error amp 13a, and thus the response of the error amp 13a is limited so that the output voltage $V_o$ does not undergo abnormal oscillation. In this manner, the error amplifier 13 has a structure similar to that of the error amplifier 6 of the DC—DC converter 5 shown in FIG. 4.

The aforementioned PWM controller 14 is provided with a differential amp 14a, and a triangular wave is input to its inverted input as a reference signal, while the output signal from the aforementioned error amplifier 13 is input to its non-inverted input. Namely, the PWM controller 14 has a structure similar to that of the PWM controller 7 of the DC—DC converter 5 shown in FIG. 4.

Thereby, the output voltage $V_0$ of the second-stage converter 12 is provided as negative feedback to the PWM controller 14, and based thereupon, by appropriately varying the duty cycles of switching transistors Q1 and Q2 of the first-stage converter 11, the intermediate voltage $V_b$ which is the output of the first-stage converter 11 is adjusted to keep the output voltage $V_0$ constant. Note that the signal (Q) that controls switching transistor Q1 is not a completely complementary signal to the inverted signal ($\overline{Q}$) that controls switching transistor Q2, but rather a stipulated amount of dead time is inserted. In addition, the switching transistors Q3 and Q4 contained in the second-stage converter 12 are controlled such that such that the duty cycle of ON/OFF switching is constant.

The aforementioned structure is similar to that of the two-stage DC—DC converter 5 shown in FIG. 4, but the two-stage DC—DC converter 10 according to this embodiment differs from the two-stage DC—DC converter 5 shown in FIG. 4 on the following points.

In the two-stage DC—DC converter 10 according to this embodiment, an operational amplifier 15 is inserted between the error amplifier 13 and PWM controller 14. The operational amplifier 15 consists of an op amp 15a and resistors R3, R4 and R15.

In this operational amplifier 15, the output signal $V_c$ from the error amplifier 13 is input to the non-inverted input of the op amp 15a and also the intermediate voltage $V_b$ which is the output of the first-stage converter 11 is voltage-divided among resistors R3 and R4 and provided as input to the inverted input of the op amp 15a, while its output is connected to the non-inverted input of the differential amp 14a of the PWM controller 14. In addition, the resistor R15 is connected between the inverted input and output of the op amp 15a.

Thereby, the output voltage $V_o$ which is the output of the second-stage converter 12 and the intermediate voltage $V_b$ which is the output of the first-stage converter 11 are respectively provided as negative feedback to the non-inverted input of the differential amp 14a of the PWM controller 14.

Here, the error amplifier 13, PWM controller 14 and operational amplifier 15 constitute a control circuit for the main circuit consisting of the first-stage converter 11 and second-stage converter 12.

Figure 9:
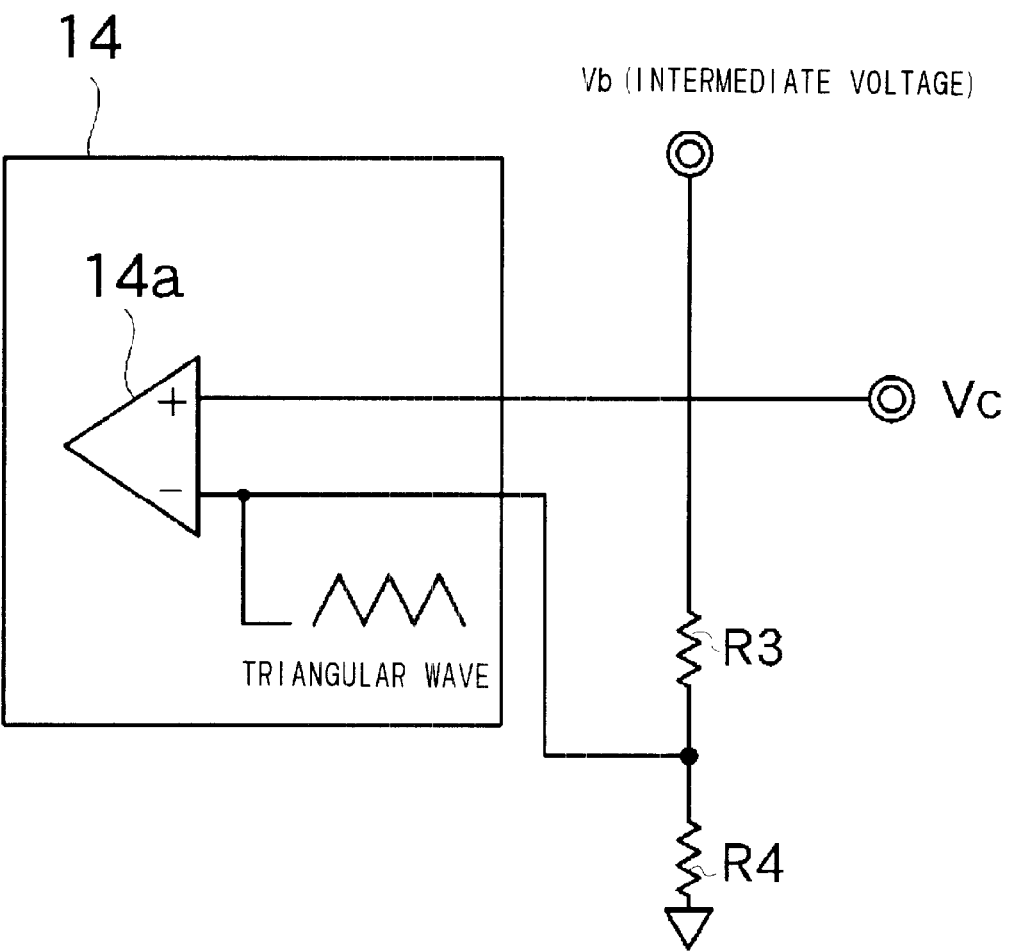
FIG. 9 is a block diagram showing the essential parts of the two-stage DC—DC converter 10 shown in FIG. 8.

Note that as shown in FIG. 9, it is also possible to use the resistors R3 and R4 alone instead of the aforementioned operational amplifier 15. In this case, in the same manner as in the two-stage DC—DC converter 5 shown in FIG. 4, the output signal $V_c$ of the error amplifier 13 is supplied to the non-inverted input of the differential amp 14a of PWM controller 14, and also, it is sufficient to supply the inverted input of the differential amp 14a of the PWM controller 14 with the voltage found by voltage-dividing the intermediate voltage $V_b$ which is the output of the first-stage converter 11 with the resistors R3 and R4, along with a triangular wave as a reference signal.

The two-stage DC—DC converter 10 according to this embodiment has the structure as described above, and its operation is as follows.

First, under the control of the PWM controller 14, the switching transistors Q1 and Q2 contained in the first-stage converter 11 are switched alternately, and the input voltage $V_i$ is thus pulsed and also pulse-width controlled by the duty ratio D of switching. The voltage thus pulsed is averaged by the filter consisting of the inductor Lb' and capacitor Cb', and the intermediate voltage $V_b$ is generated.

Moreover, in the second-stage converter 12, this intermediate voltage $V_b$ is pulsed by the switching transistors Q3 and Q4, the voltage is transformed based on the number of turns n of the transformer T, it is further rectified by rectifying transistors Q5 and Q6, and then again averaged by a filter consisting of the inductor Lo and capacitor Co, and thus the output voltage $V_o$ is generated. As described above, the switching transistors Q3 and Q4 contained within the second-stage converter 12 are controlled such that the duty cycle of ON/OFF switching is constant.

In this case, in the PWM controller 14, the output voltage $V_o$ of the second-stage converter 12 is provided as negative feedback via the error amplifier 13 in an external loop, while the intermediate voltage $V_b$ of the first-stage converter 11 is provided as negative feedback in an internal loop. Thereby, the PWM controller 14 alternately turns ON the switching transistors Q1 and Q2 contained in the first-stage converter 11 and appropriately adjusts the duty ratio D of switching transistor Q1 based on the output voltage $V_o$ and intermediate voltage $V_b$, thereby stabilizing the output voltage $V_o$.

Figure 10:
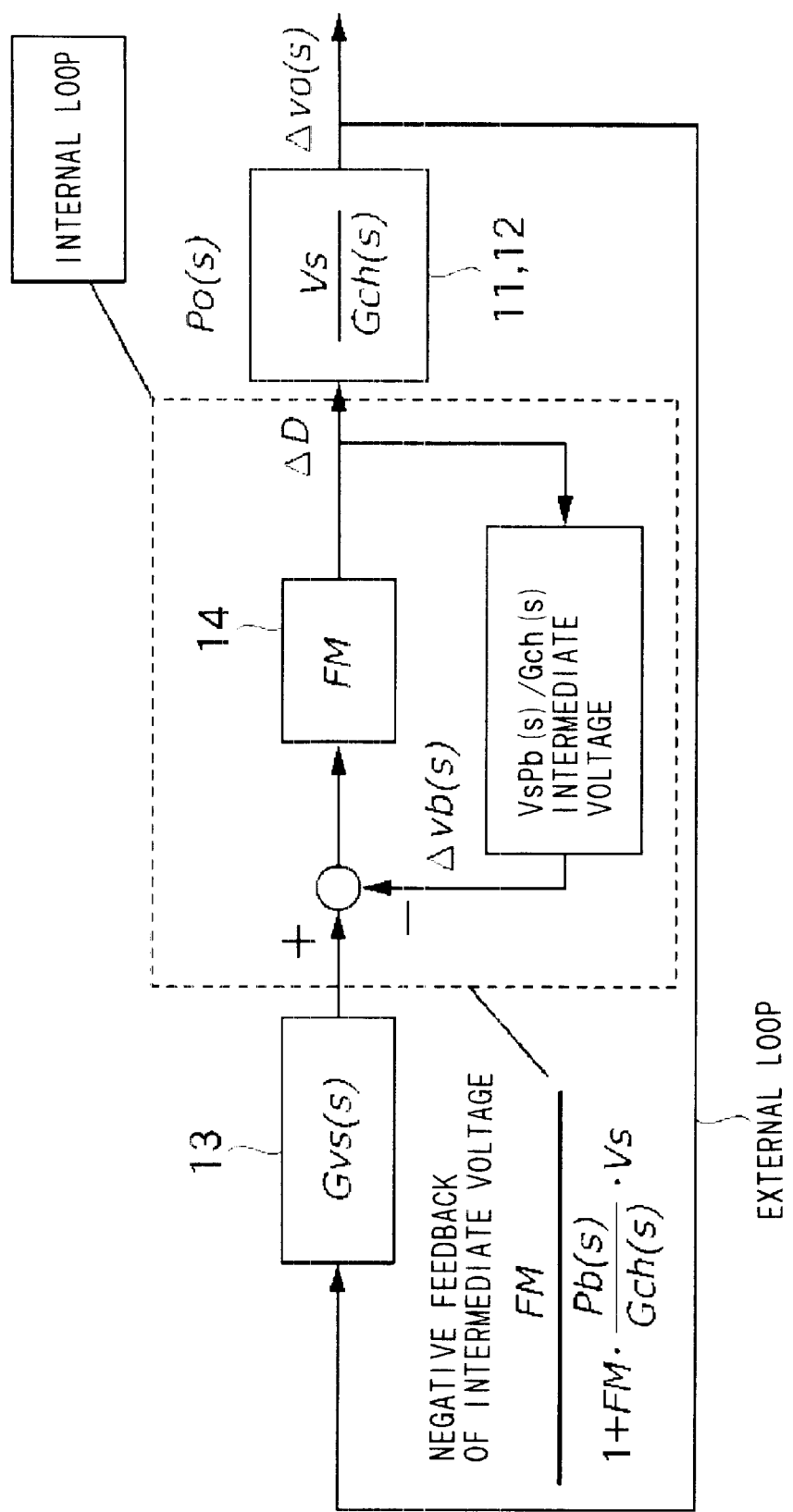
FIG. 10 is a block diagram showing the control system of the two-stage DC—DC converter 10 shown in FIG. 8.

Accordingly, as shown in FIG. 10, the output voltage feedback control system consisting of the aforementioned error amplifier 13 and PWM controller 14 contains an internal loop with a transfer function $\Delta vb/\Delta D$ of the intermediate voltage $V_b$. Accordingly, the overall transfer function PPb(s) is represented by the following equation:

$$PPb(s) = \frac{Vs}{Gch(s)} \cdot \underbrace{\frac{FM}{1 + \frac{Pb(s)}{Gch(s)} \cdot FM \cdot Vs}}_{\text{Internal loop}} \cdot Gvs(s). \tag{18}$$

Here, if the frequency response of the error amplifier 13 is adjusted so that the zero-cross frequency of the gain of the aforementioned transfer function PPb(s) becomes 1 kHz, then the overall Bode plot shown in FIG. 11 is obtained. In FIG. 11, (a) is a Bode plot showing the gain as a function of frequency, while (b) is a Bode plot showing the phase as a function of frequency.

As shown in FIG. 11, the frequency at which the phase crosses zero degrees is 17 kHz so one can see that this is shifted toward the high-frequency side in comparison to the two-stage DC—DC converter 5 shown in FIG. 4. Thus, the gain margin becomes approximately −15 dB, so one can see that in comparison to the gain margin of approximately −1 dB in the two-stage DC—DC converter 5 shown in FIG. 4, a much larger gain margin is obtained. Thus, the output voltage feedback control stabilizes the system.

Figure 12:
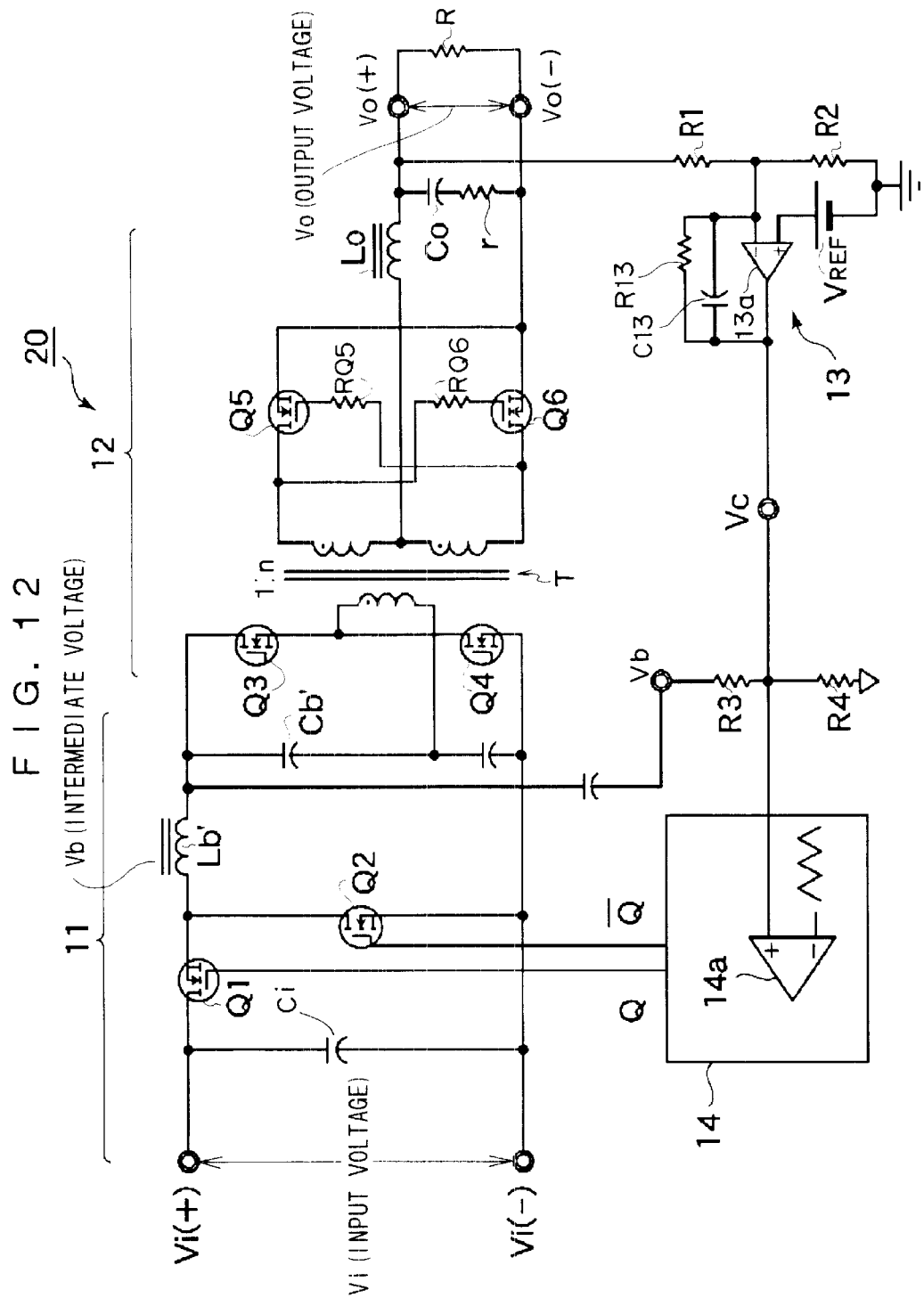
FIG. 12 is a circuit diagram showing the two-stage DC—DC converter according to Preferred Embodiment 2 of the present invention.

FIG. 12 is a circuit diagram showing the two-stage DC—DC converter according to Preferred Embodiment 2 of the present invention.

The two-stage DC—DC converter 20 according to this embodiment has a structure similar to that of the two-stage DC—DC converter 10 shown in FIG. 8, so the same structural elements are given the same symbols and the explanations thereof are omitted.

In the two-stage DC—DC converter 20 according to this embodiment, the intermediate voltage $V_b$ of the first-stage converter 11 is voltage-divided among resistors R3 and R4 and provided as input to the non-inverted input of the differential amp 14a of the PWM controller 14, and thus it is provided as positive feedback to the PWM controller 14. This and the fact that no operational amplifier 15 is provided are the differences from the two-stage DC—DC converter 10 shown in FIG. 8. In the two-stage DC—DC converter 20 according to this embodiment, the control circuit consists of the error amplifier 13, PWM controller 14 and resistors R3 and R4.

With a two-stage DC—DC converter 20 having such a structure, in the same manner as the two-stage DC—DC converter 10 shown in FIG. 8, the intermediate voltage $V_b$ is generated in the first-stage converter 11 and the output voltage $V_o$ is generated in the second-stage converter 12.

In this case, in the PWM controller 14, the output voltage $V_o$ of the second-stage converter 12 is provided as negative feedback via the error amplifier 13 in an external loop, while the intermediate voltage $V_b$ of the first-stage converter 11 is provided as positive feedback in an internal loop. Thereby, the PWM controller 14 alternately turns ON the switching transistors Q1 and Q2 contained in the first-stage converter 11 and appropriately adjusts the duty ratio D of switching transistor Q1 based on the output voltage $V_o$ and intermediate voltage $V_b$, thereby stabilizing the output voltage $V_o$.

Figure 13:
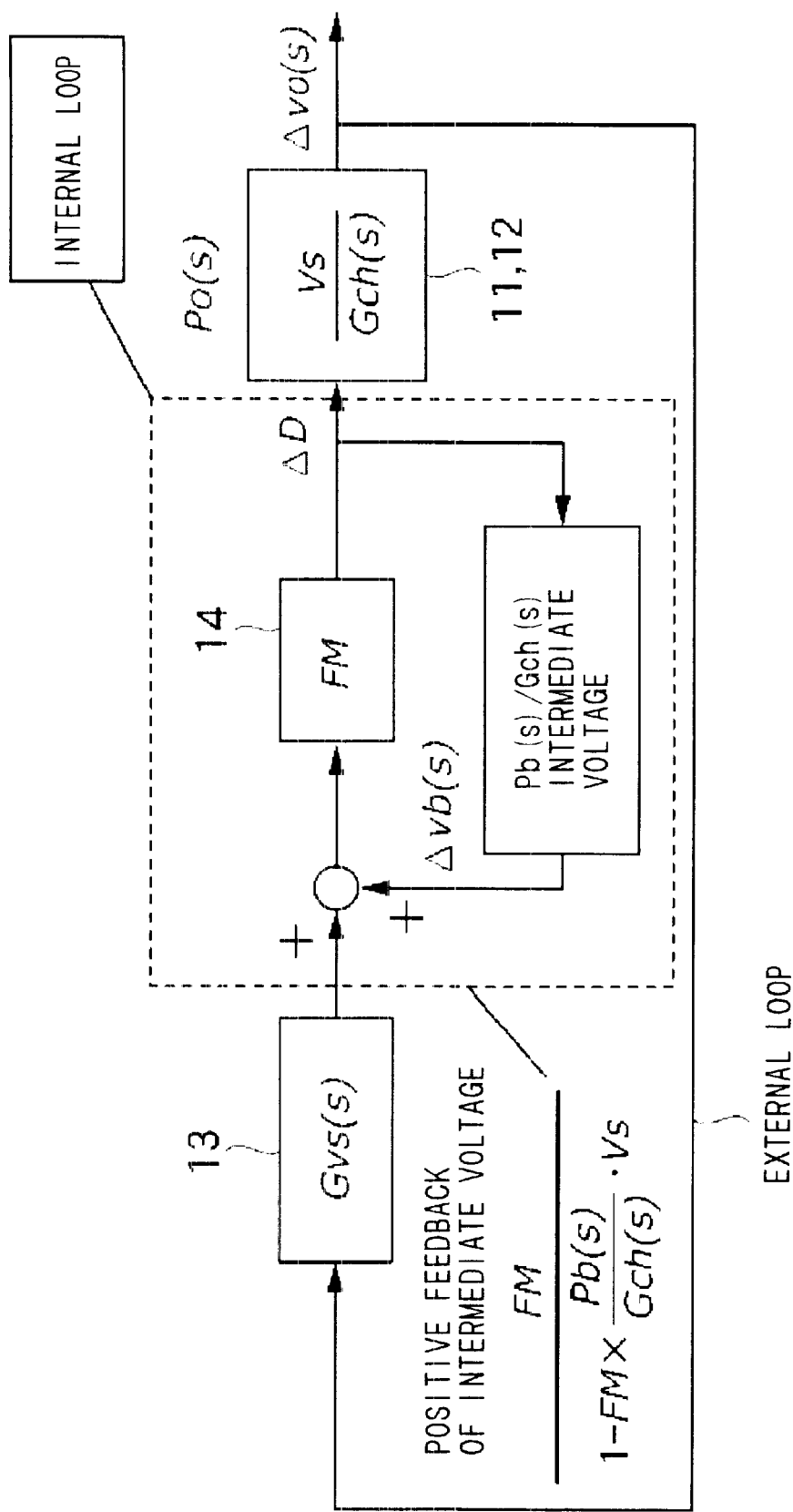
FIG. 13 is a block diagram showing the control system of the two-stage DC—DC converter 20 shown in FIG. 12.

Accordingly, as shown in FIG. 13, the output voltage feedback control system consisting of the aforementioned error amplifier 13 and PWM controller 14 contains an internal loop with a transfer function $\Delta vb/\Delta D$ of the intermediate voltage $V_b$. Accordingly, the overall transfer function PTP(s) is represented by the following equation:

$$PTP(s) = \frac{Vs}{Gch(s)} \cdot \underbrace{\frac{FM}{1 - \frac{Pb(s)}{Gch(s)} \cdot Vs \cdot FM}}_{\text{Internal loop}} \cdot Gvs(s). \tag{19}$$

Here, if the frequency response of the error amplifier 13 is adjusted so that the zero-cross frequency of the gain of the aforementioned transfer function PTP(s) becomes 1 kHz, then the overall Bode plot shown in FIG. 14 is obtained. In FIG. 14, (a) is a Bode plot showing the gain as a function of frequency, while (b) is a Bode plot showing the phase as a function of frequency.

In this case, since the "−" sign appears in the denominator of the second term on the right-hand side of the transfer function PTP(s), among the two resonance points $\omega_\alpha/2\pi$ and $\omega_\beta/2\pi$, one can see that the resonance point $\omega_\alpha/2\pi$ on the low-frequency side disappears. Accordingly, at the frequency of 30 kHz at which the phase crosses zero degrees, the gain margin becomes approximately −35 dB, so a much larger gain margin is obtained. Thus, the output voltage feedback control stabilizes the system even further.

Figure 15:
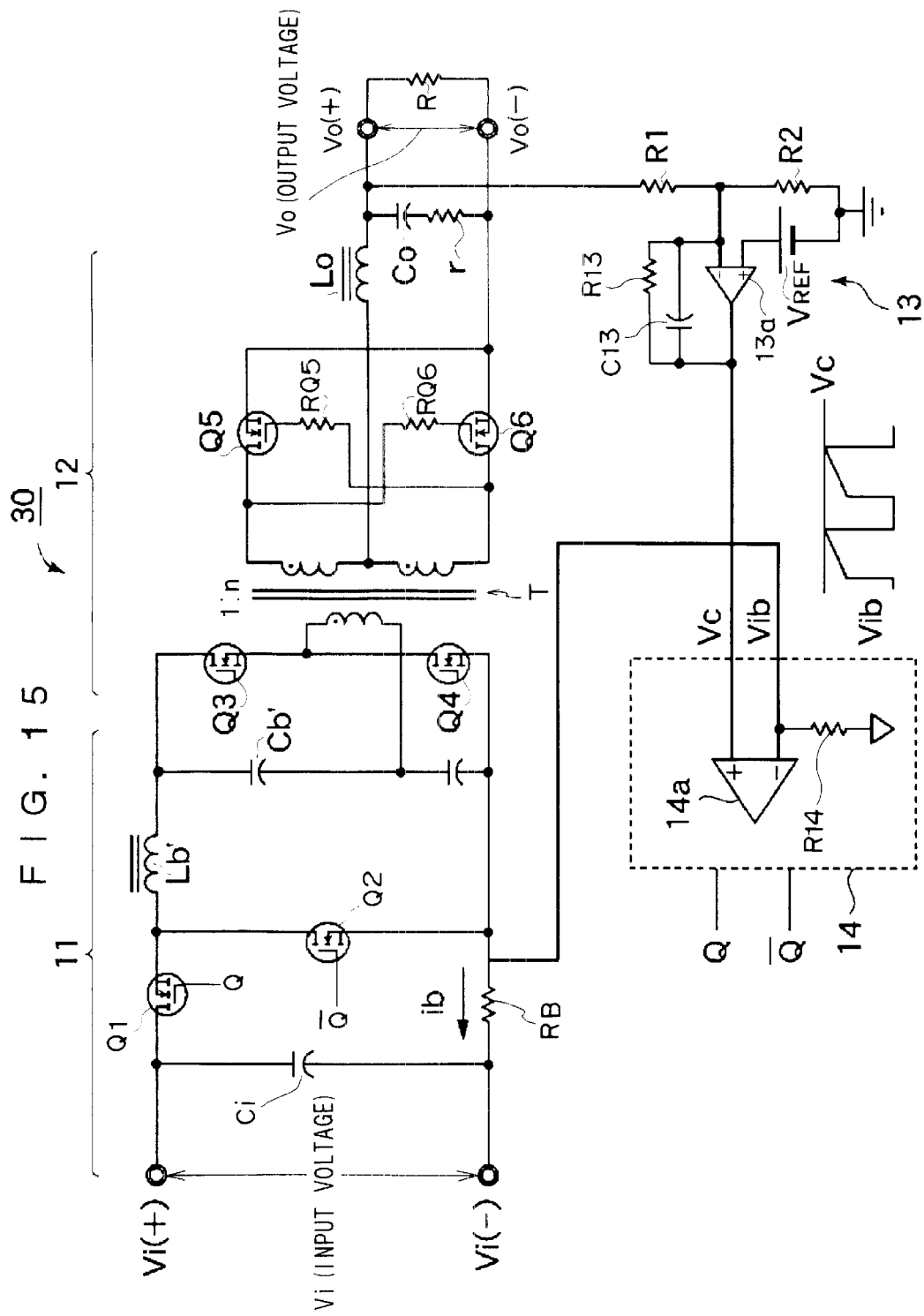
FIG. 15 is a circuit diagram showing the two-stage DC—DC converter according to Preferred Embodiment 3 of the present invention.

FIG. 15 is a circuit diagram showing the two-stage DC—DC converter according to Preferred Embodiment 3 of the present invention.

The two-stage DC—DC converter 30 according to this embodiment has a structure similar to that of the two-stage DC—DC converter 10 shown in FIG. 8, so the same structural elements are given the same symbols and the explanations thereof are omitted.

In the two-stage DC—DC converter 30 according to this embodiment, a resistor RB for detecting the switching current $i_b$ flowing through the first-stage converter 11 is added, and thus the current signal $V_{ib}$ detected thereby is input to the inverted input of the differential amp 14a of the PWM controller 14 as a reference signal instead of the triangular wave. In addition, a resistor R14 is connected between the inverted input and ground potential of the differential amp 14a of PWM controller 14. Moreover, the output signal $V_c$ of the error amplifier 13 is connected directly to the non-inverted input of the differential amp 14a of the PWM controller 14. The operational amplifier 15 is not provided. On the above points, it has a structure different from that of the two-stage DC—DC converter 10 shown in FIG. 8. In the two-stage DC—DC converter 30 according to this embodiment, the control circuit consists of the error amplifier 13 and PWM controller 14.

With a two-stage DC—DC converter 30 having such a structure, in the same manner as the two-stage DC—DC converter 10 shown in FIG. 8, the intermediate voltage $V_b$ is generated in the first-stage converter 11 and the output voltage $V_o$ is generated in the second-stage converter 12.

In this case, in the PWM controller 14, the output voltage $V_o$ of the second-stage converter 12 is provided as negative feedback via the error amplifier 13 in an external loop, while the current signal $V_{ib}$ indicating the switching current $i_b$ flowing through the first-stage converter 11 is provided as feedback in an internal loop. Thereby, the PWM controller 14 alternately turns ON the switching transistors Q1 and Q2 contained in the first-stage converter 11 and appropriately adjusts the duty ratio D of switching transistor Q1 based on the output voltage $V_o$ and intermediate voltage $V_b$, thereby stabilizing the output voltage $V_o$.

Figure 16:
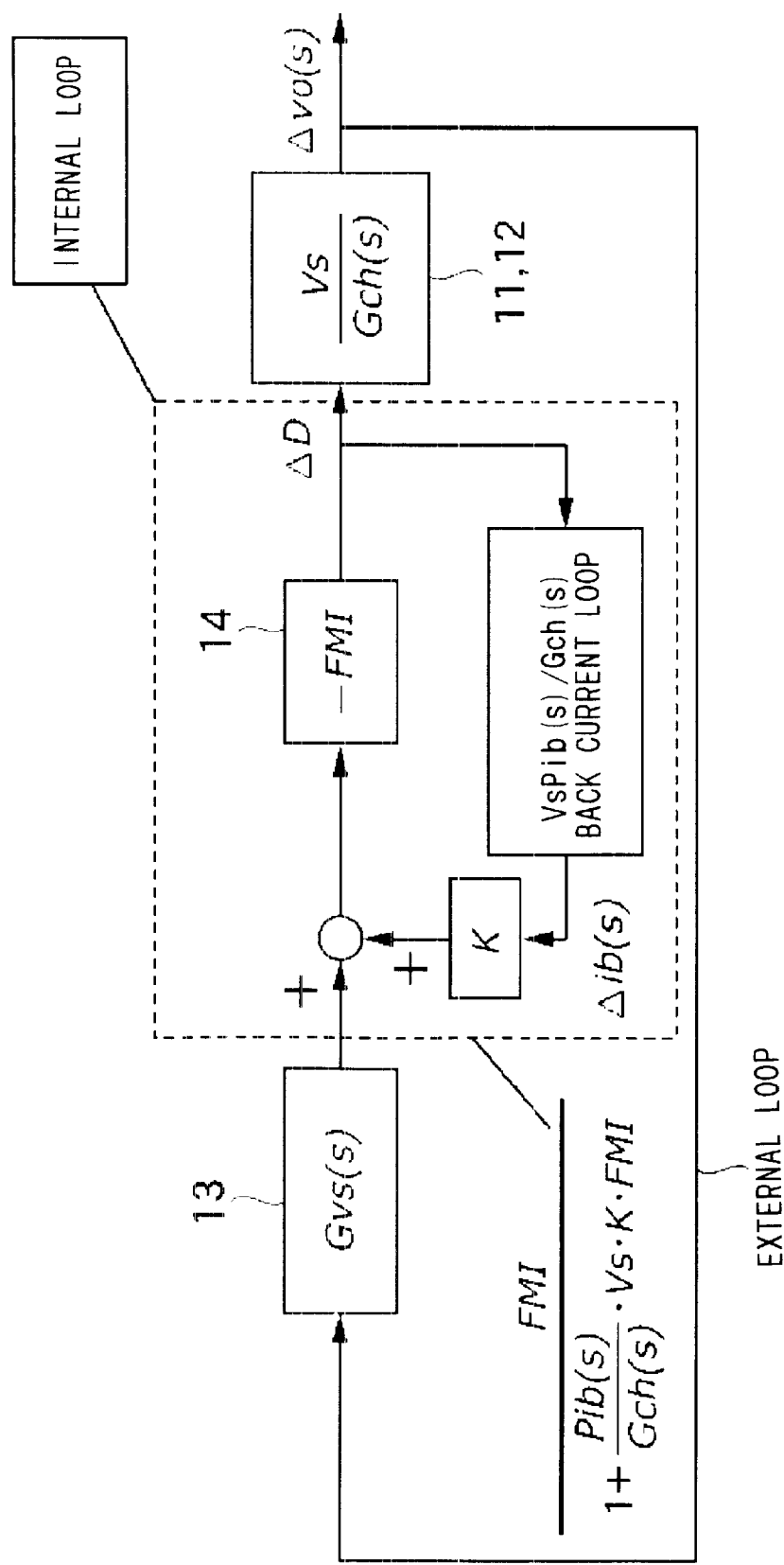
FIG. 16 is a block diagram showing the control system of the two-stage DC—DC converter 30 shown in FIG. 15.

Accordingly, as shown in FIG. 16, the output voltage feedback control system consisting of the aforementioned error amplifier 13 and PWM controller 14 contains an internal loop with a transfer function $\Delta vb/\Delta D$ of the switching current $i_b$. Thus, the overall transfer function PPib(s) is represented by the following equation:

$$PPib(s) = \frac{Vs}{Gch(s)} \cdot \underbrace{\frac{-FMI}{1 + \frac{Pb(s)}{Gch(s)} \cdot Vs \cdot FMI \cdot K}}_{\text{Internal loop}} \cdot Gvs(s). \quad (20)$$

We shall now study the effect of the internal loop in a control system having such a structure.

For ease of understanding, we shall study the transfer function Px(s) of the main circuit with the Gvs(s) term in equation (20) above omitted (containing the transfer function of the internal loop), below:

$$Px(s) = \frac{Vs}{Gch(s)} \cdot \underbrace{\frac{-FMI}{1 + \frac{Pib(s)}{Gch(s)} \cdot Vs \cdot FMI \cdot K}}_{\text{Internal loop}}. \quad (21)$$

Since the Pib(s) shown in equation (13) is a cubic function of s, so assuming $$1 \ll \frac{Pib(s)}{Gch(s)} \cdot Vs \cdot FMI \cdot K \quad (22)$$

equation (21) above can be approximated by $$Px(s) = \frac{1}{Gch(s)} \cdot \frac{-1}{\frac{Pib(s)}{Gch(s)} \cdot K} = \frac{-1}{Pib(s) \cdot K} = \quad (23)$$

$$\frac{-1}{\{s^3 CoCbLo(R+r) + s^2 Cb(rCoR + Lo) + s(Cor + CbR + CoR) + 1\}/R} \cdot \frac{1}{K}$$

and if r=0, and when represented as $$Px(s) = \frac{-1}{s^3 \cdot CoCbLo + s^2 \cdot \frac{CbLo}{R} + s \cdot (Cb + Co) + \frac{1}{R}} \quad (24)$$

$$= \frac{-1}{CoCbLo} \cdot \frac{1}{(s + \omega_\alpha)(s^2 + \omega_\beta^2)}$$

$$\omega_\alpha = \frac{1}{CoR}, \quad \omega_\beta = \frac{1}{\sqrt{\frac{CoCb}{Co+Cb} \cdot Lo}} \quad (25)$$

one can see that this is a combination of the inflection points and resonance points.

Upon calculating $\omega_\alpha/2\pi$ and $\omega_{62}/2\pi$, $$\frac{\omega_\alpha}{2\pi} = \frac{1}{2\pi \cdot CoR} = \frac{1}{2\pi \times 235_{\mu F} \times 1} = 677_{Hz}, \frac{\omega_\beta}{2\pi} = 45_{kHz} \quad (26)$$

are obtained.

Accordingly, in this case, the two resonance points $\omega_\alpha/2\pi$ and $\omega_\beta/2\pi$ present in single-loop (external-loop) output voltage feedback control, which is a fourth-order delay system, will vanish, so it will become a third-order delay system and thus the operation of the control system will be further stabilized.

Figure 17:
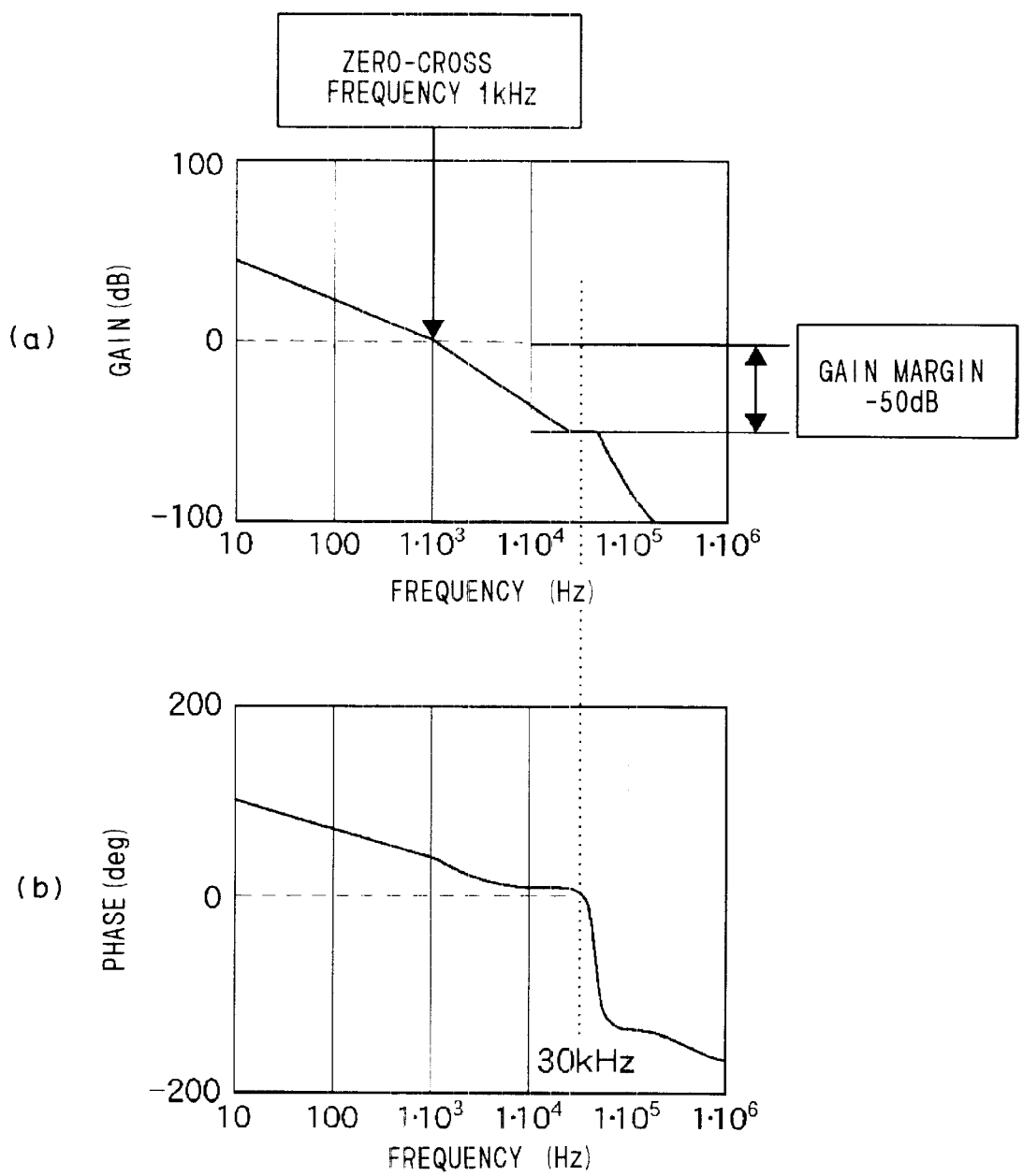
FIG. 17 presents Bode plots showing the frequency response of the two-stage DC—DC converter 30 shown in FIG. 15, where (a) is a Bode plot showing the gain as a function of frequency, while (b) is a Bode plot showing the phase as a function of frequency.

Here, if the frequency response of the error amplifier 13 is adjusted so that the zero-cross frequency of the gain of the aforementioned transfer function PPib(s) becomes 1 kHz, then the overall Bode plot shown in FIG. 17 is obtained. In FIG. 17, (a) is a Bode plot showing the gain as a function of frequency, while (b) is a Bode plot showing the phase as a function of frequency.

As shown in FIG. 17, the two resonance points $\omega_\alpha/2\pi$ and $\omega_\beta/2\pi$ vanish, so at the frequency of 30 kHz at which the phase crosses zero degrees, the gain margin becomes approximately −50 dB and thus a much larger gain margin is obtained. Accordingly, the output voltage feedback control stabilizes the system even further.

Figure 18:
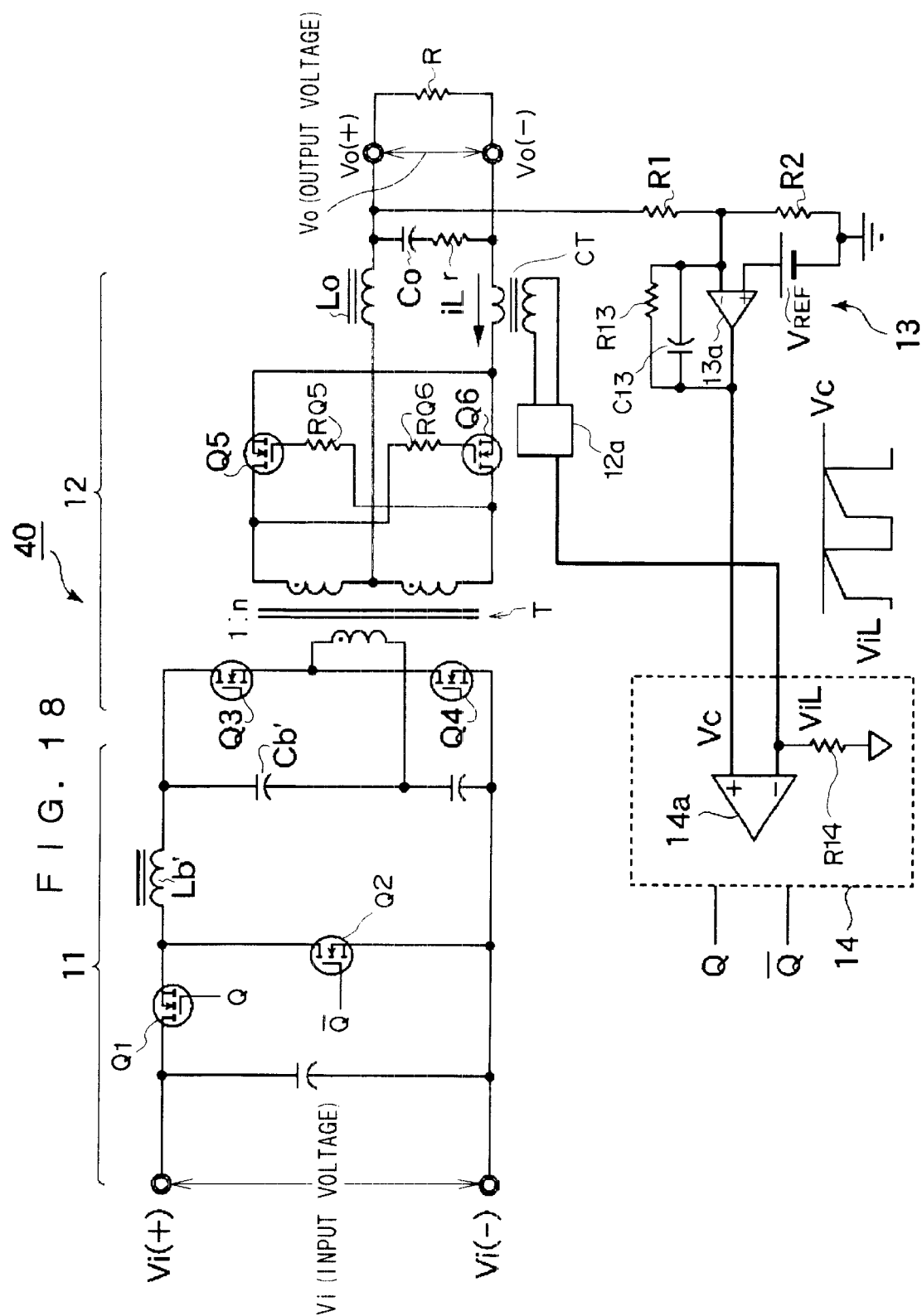
FIG. 18 is a circuit diagram showing the two-stage DC—DC converter according to Preferred Embodiment 4 of the present invention.

FIG. 18 is a circuit diagram showing the two-stage DC—DC converter according to Preferred Embodiment 4 of the present invention.

The two-stage DC—DC converter 40 according to this embodiment has a structure similar to that of the two-stage DC—DC converter 10 shown in FIG. 8, so the same structural elements are given the same symbols and the explanations thereof are omitted.

In the two-stage DC—DC converter 40 according to this embodiment, a current transformer CT for detecting the inductor current $i_L$ flowing through the second-stage converter 12 and a rectifier 12a that rectifies the output of the current transformer CT and generates the current signal $V_{iL}$ are added, and thus this current signal $V_{iL}$ is input to the inverted input of the differential amp 14a of the PWM controller 14 as a reference signal instead of the triangular wave. In addition, a resistor R14 is connected between the inverted input and ground potential of the differential amp 14a of PWM controller 14. Moreover, the output signal $V_c$ of the error amplifier 13 is connected directly to the non-inverted input of the differential amp 14a of the PWM controller 14. The operational amplifier 15 is not provided. On the above points, it has a structure different from that of the two-stage DC—DC converter 10 shown in FIG. 8. In the two-stage stage DC—DC converter 40 according to this embodiment, the control circuit consists of the error amplifier 13 and PWM controller 14.

With a two-stage DC—DC converter 40 having such a structure, in the same manner as the two-stage DC—DC converter 10 shown in FIG. 8, the intermediate voltage $V_b$ is generated in the first-stage converter 11 and the output voltage $V_o$ is generated in the second-stage converter 12.

In this case, in the PWM controller 14, the output voltage $V_o$ of the second-stage converter 12 is provided as negative feedback via the error amplifier 13 in an external loop, while the current signal $V_{iL}$ indicating the output inductor current $i_L$ of the second-stage converter 12 is provided as feedback in an internal loop. Thereby, the PWM controller 14 alternately turns ON the switching transistors Q1 and Q2 contained in the first-stage converter 11 and appropriately adjusts the duty ratio D of switching transistor Q1 based on the output voltage $V_o$ and intermediate voltage $V_b$, thereby stabilizing the output voltage $V_o$.

Figure 19:
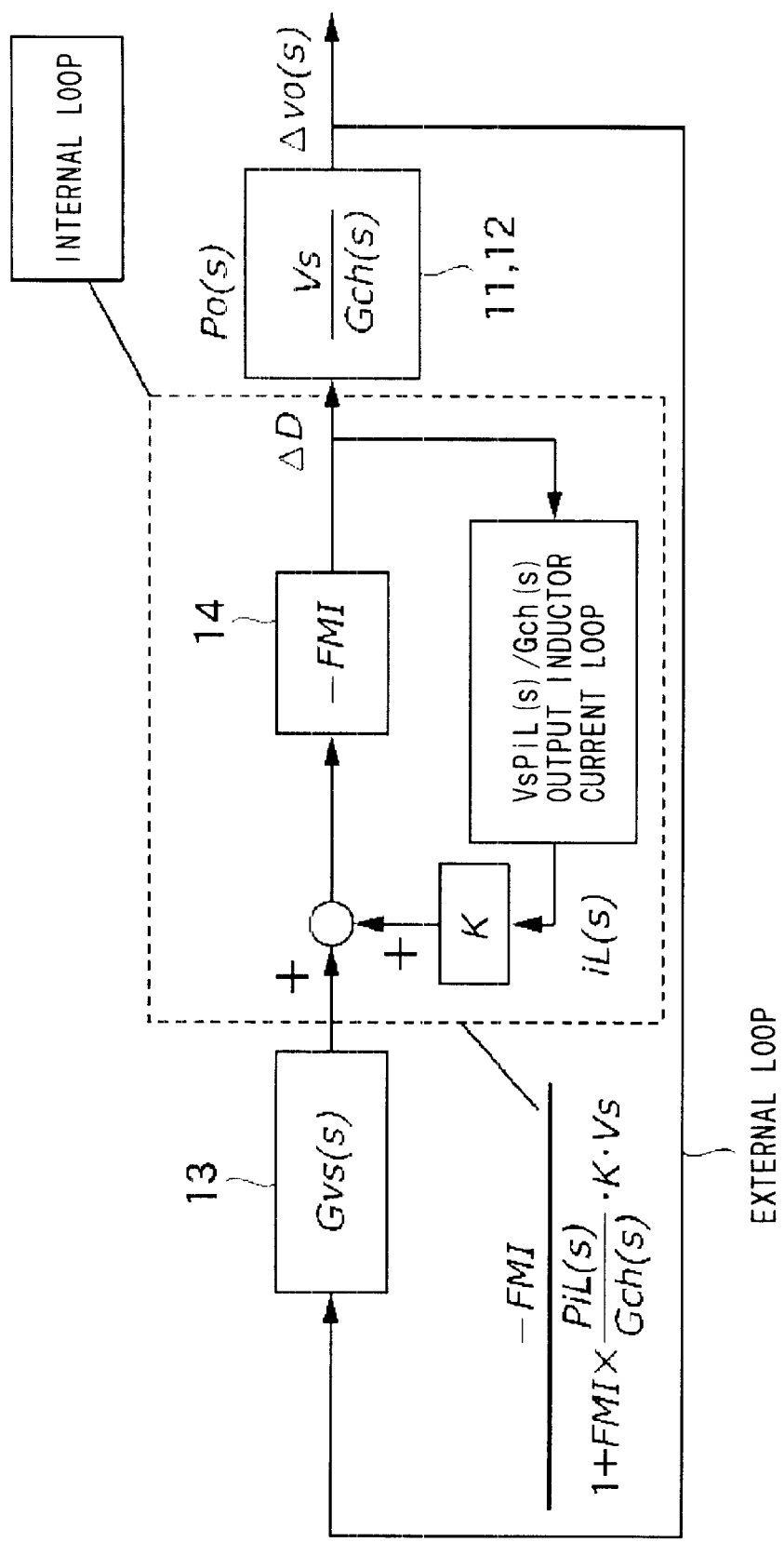
FIG. 19 is a block diagram showing the control system of the two-stage DC—DC converter 40 shown in FIG. 18.

Accordingly, as shown in FIG. 19, the output voltage feedback control system consisting of the aforementioned error amplifier 13 and PWM controller 14 contains an internal loop with a transfer function $\Delta iL/\Delta D$ of the output inductor current $i_L$. At this time, the relationship between the output inductor current $i_L$ and the duty ratio D is given by the aforementioned equation (8), so the overall transfer function PPiL(s) is represented by the following equation:

$$PPiL(s) = \frac{Vs}{Gch(s)} \cdot \underbrace{\frac{-FMI}{1 + \frac{P_{iL(s)}}{Gch(s)} \cdot Vs \cdot FMI}}_{\text{Internal loop}} \cdot Gvs(s). \quad (27)$$

Here, if the frequency response of the error amplifier 13 is adjusted so that the zero-cross frequency of the gain of the aforementioned transfer function PPiL(s) becomes 1 kHz, then the overall Bode plot shown in FIG. 20 is obtained. In FIG. 20, (a) is a Bode plot showing the gain as a function of frequency, while (b) is a Bode plot showing the phase as a function of frequency.

In this case, one can see that the phase of the aforementioned transfer function PTP(s) does not reach zero degrees. Accordingly, this means that the phase does not reach zero degrees so the control system is constantly stabilized.

As explained in the foregoing, with the present invention, the output voltage of the second-stage converter is provided as negative feedback to the PWM controller via an external loop, and also the intermediate voltage of the first-stage converter is provided as positive feedback via an internal loop, or the switching current of the first-stage converter or current flowing through the second-stage converter is provided as feedback.

Thereby, in comparison to the case of an external loop alone, the resonance frequency on the low-frequency side in the transfer function for the entire control system is shifted to a higher frequency or vanishes, and accordingly, the frequency at which the phase crosses zero degrees also becomes higher or it no longer crosses zero degrees. Accordingly, the gain margin is increased and the operation of the control system is stabilized.

The present invention is in no way limited to the aforementioned embodiments, but rather various modifications are possible within the scope of the invention as recited in the claims, and naturally these modifications are included within the scope of the invention.

For example, in the various embodiments described above, a buck type is used as the first-stage converter 11 and a half-bridge type is used as the second-stage converter 12, but this is not a limitation, as it is clear that a boost type or buck-boost type may be used as the first-stage converter 11 and a full-bridge type or push-pull type may be used as the second-stage converter 12.

In addition, the present invention was described in the aforementioned various embodiments using a two-stage DC—DC converter as an example, but the object of the present invention is not limited thereto, but rather the present invention may also be applied to a DC—DC converter formed by connecting three or more converters in series.

What is claimed is:

1. A multi-stage DC—DC converter comprising:
   a non-isolated DC—DC converter that is able to adjust an intermediate voltage by PWM control as a first-stage converter;
   an isolated DC—DC converter as a second-stage converter; and
   a PWM controller that controls a duty cycle of switching of the first-stage converter by means of negative feedback of an output voltage of the second-stage converter, the intermediate voltage of the first-stage converter is provided as negative feedback to the PWM controller.

2. The multi-stage DC—DC converter as claimed in claim 1, wherein the intermediate voltage is provided as negative feedback to the PWM controller via an operational amplifier.

3. A multi-stage DC—DC converter configured as a two-stage DC—DC converter comprising:
   a non-isolated DC—DC converter that is able to adjust an intermediate voltage by PWM control as a first-stage converter;
   an isolated DC—DC converter as a second-stage converter; and
   a PWM controller that controls a duty cycle of switching of the first-stage converter by means of negative feedback of an output voltage of the second-stage converter, the intermediate voltage of the first-stage converter is provided as positive feedback to the PWM controller.

4. A multi-stage DC—DC converter configured as a two-stage DC—DC converter comprising:
   a non-isolated DC—DC converter that is able to adjust an intermediate voltage by PWM control as a first-stage converter;
   an isolated DC—DC converter as a second-stage converter; and a PWM controller that controls a duty cycle of switching of the first-stage converter by means of negative feedback of an output voltage of the second-stage converter, a switching current of the first-stage converter is provided as feedback to the PWM controller.

5. A multi-stage DC—DC converter configured as a two-stage DC—DC converter comprising:

a non-isolated DC—DC converter that is able to adjust an intermediate voltage by PWM control as a first-stage converter;

an isolated DC—DC converter as a second-stage converter; and a PWM controller that controls a duty cycle of switching of the first-stage converter by means of negative feedback of an output voltage of the second-stage converter, a current flowing through the second-stage converter is provided as feedback to the PWM controller.

6. A multi-stage DC—DC converter comprising:

a first DC—DC converter;

a second DC—DC converter provided as a latter stage to the first DC—DC converter; and a control circuit that controls a switching operation performed by the first DC—DC converter based on at least an output voltage of the first DC—DC converter and an output voltage of the second DC—DC converter.

7. The multi-stage DC—DC converter as claimed in claim 6, wherein the control circuit comprises:

a first signal generation circuit that generates a first control signal based on the output voltage of the second DC—DC converter;

a second signal generation circuit that generates a second control signal based on the output voltage of the first DC—DC converter and the first control signal; and a controller that controls the switching operation performed by the first DC—DC converter based on the second control signal.

8. The multi-stage DC—DC converter as claimed in claim 7, wherein the first signal generation circuit compares the output voltage of the DC—DC converter against a reference voltage and generates the first control circuit thereupon.

9. The multi-stage DC—DC converter as claimed in claim 8, wherein the controller performs PWM control of switch elements contained in the first DC—DC converter based on the second control signal.

10. The multi-stage DC—DC converter as claimed in claim 6, wherein the first DC—DC converter is a non-isolated DC—DC converter and the second DC—DC converter is an isolated DC—DC converter.

11. The multi-stage DC—DC converter as claimed in claim 10, wherein the first DC—DC converter is a buck DC—DC converter and the second DC—DC converter is a half-bridge DC—DC converter.

12. A multi-stage DC—DC converter comprising:

a first DC—DC converter;

a second DC—DC converter provided as a latter stage to the first DC—DC converter; and a control circuit that controls a switching operation performed by the first DC—DC converter based on at least one of a current flowing through the first DC—DC converter and a current flowing through the second DC—DC converter, and an output voltage of the second DC—DC converter.

13. The multi-stage DC—DC converter as claimed in claim 12, wherein the control circuit comprises:

a signal generation circuit that compares the output voltage of said second DC—DC converter against a reference voltage and generates a control signal based thereupon; and a controller that controls the switching operation performed by the first DC—DC converter based on the control signal and at least one of the current flowing through the first DC—DC converter and the current flowing through the second DC—DC converter.

14. The multi-stage DC—DC converter as claimed in claim 13, wherein the controller performs PWM control of switch elements contained in the first DC—DC converter based on the control signal and at least one of the current flowing through the first DC—DC converter and the current flowing through the second DC—DC converter.

15. The multi-stage DC—DC converter as claimed in claim 12, wherein the first DC—DC converter is a non-isolated DC—DC converter and the second DC—DC converter is an isolated DC—DC converter.

16. The multi-stage DC—DC converter as claimed in claim 15, wherein the first DC—DC converter is a buck DC—DC converter and the second DC—DC converter is a half-bridge DC—DC converter.

* * * * *